(12) United States Patent
Meadow et al.

(10) Patent No.: US 9,311,396 B2
(45) Date of Patent: Apr. 12, 2016

(54) METHOD OF PROVIDING STREET VIEW DATA OF A REAL ESTATE PROPERTY

(71) Applicants: William D. Meadow, Jacksonville, FL (US); Randall A. Gordie, Jr., St. Augustine, FL (US)

(72) Inventors: William D. Meadow, Jacksonville, FL (US); Randall A. Gordie, Jr., St. Augustine, FL (US)

(73) Assignee: Visual Real Estate, Inc., Jacksonville, FL (US)

( * ) Notice: Subject to any disclaimer, the term of this patent is extended or adjusted under 35 U.S.C. 154(b) by 405 days.

(21) Appl. No.: 13/791,943

(22) Filed: Mar. 9, 2013

(65) Prior Publication Data

US 2014/0089811 A1 Mar. 27, 2014

Related U.S. Application Data

(63) Continuation of application No. 13/481,912, filed on May 28, 2012, which is a continuation of application No. 12/036,197, filed on Feb. 22, 2008, now Pat. No. 8,207,964, which is a continuation-in-part of application No. 11/216,465, filed on Aug. 31, 2005, now Pat. No. 7,389,181.

(60) Provisional application No. 60/605,498, filed on Aug. 31, 2004.

(51) Int. Cl.
*G06F 3/00* (2006.01)
*G06F 17/30* (2006.01)
*G06T 17/05* (2011.01)
(Continued)

(52) U.S. Cl.
CPC .......... *G06F 17/3082* (2013.01); *G06F 3/0484* (2013.01); *G06F 17/21* (2013.01); *G06F 17/30244* (2013.01); *G06F 17/30265* (2013.01); *G06Q 10/10* (2013.01); *G06Q 30/0278* (2013.01); *G06Q 30/0623* (2013.01); *G06Q 30/0629* (2013.01); *G06Q 50/16* (2013.01); *G06T 3/4038* (2013.01); *G06T 11/60* (2013.01); *G06T 17/05* (2013.01); *G06T 17/20* (2013.01); *G06T 19/006* (2013.01);
(Continued)

(58) Field of Classification Search
CPC ................................................. G06Q 30/0205
See application file for complete search history.

(56) References Cited

U.S. PATENT DOCUMENTS 5,487,116 A 1/1996 Nakano et al.
5,633,946 A 5/1997 Lachinski et al.
(Continued)

OTHER PUBLICATIONS

A. Akbarzadeh, et. al. "Towards Urban Reconstruction from Video", 3dPVT2006 Proceedings, Jun. 14, 2006.
(Continued)

*Primary Examiner* — Omar Abdul-Ali
(74) *Attorney, Agent, or Firm* — Joseph Kincart; Ideation Law, PLLC

(57) ABSTRACT

Video drive-by data provides a street level view of a neighborhood surrounding a selected geographic location. A video and data server farm incorporates a video storage server that stores video image files containing video drive-by data corresponding to a geographic location, a database server that processes a data query received from a user over the Internet corresponding to a geographic location of interest, and an image processing server. In operation, the database server identifies video image files stored in the video storage server that correspond to the geographic location of interest contained in the data query and transfers the video image files over a pre-processing network to the image processing server. The image processing server converts the video drive-by data to post-processed video data corresponding to a desired image format and transfers the post-processed video data via a post-processing network to the Internet in response to the query.

20 Claims, 26 Drawing Sheets

(51) Int. Cl.
*G06T 17/20* (2006.01)
*H04N 5/232* (2006.01)
*H04N 7/18* (2006.01)
*G06T 19/00* (2011.01)
*G06Q 30/06* (2012.01)
*G06Q 50/16* (2012.01)
*G06Q 30/02* (2012.01)
*G06T 11/60* (2006.01)
*G06Q 10/10* (2012.01)
*G06F 17/21* (2006.01)
*G06T 3/40* (2006.01)
*G06F 3/0484* (2013.01)
*H04N 5/28* (2006.01)

(52) U.S. Cl.
CPC ............ *H04N 5/23238* (2013.01); *H04N 5/28* (2013.01); *H04N 7/18* (2013.01); *H04N 7/181* (2013.01)

(56) References Cited

U.S. PATENT DOCUMENTS

| | | | |
|---|---|---|---|
| 5,684,514 A | 11/1997 | Branscomb | |
| 6,043,837 A | 3/2000 | Driscoll et al. | |
| 6,108,728 A | 8/2000 | Kobayashi | 710/74 |
| 6,111,583 A | 8/2000 | Yaron et al. | 345/421 |
| 6,237,006 B1 | 5/2001 | Weinberg et al. | |
| 6,266,615 B1 | 7/2001 | Jin | |
| 6,307,573 B1* | 10/2001 | Barros | 715/764 |
| 6,366,892 B1 | 4/2002 | Altman et al. | |
| 6,421,003 B1 | 7/2002 | Riley et al. | 342/357.38 |
| 6,504,571 B1 | 1/2003 | Narayanaswami et al. | |
| 6,525,731 B1 | 2/2003 | Suits et al. | |
| 6,563,529 B1* | 5/2003 | Jongerius | 348/36 |
| 6,594,600 B1 | 7/2003 | Arnoul et al. | |
| 6,597,818 B2 | 7/2003 | Kumar et al. | |
| 6,625,315 B2 | 9/2003 | Laumeyer et al. | |
| 6,678,394 B1 | 1/2004 | Nichani | |
| 6,741,790 B1 | 5/2004 | Burgess | |
| 6,759,979 B2 | 7/2004 | Vashisth et al. | 342/357.31 |
| 6,798,924 B2 | 9/2004 | Ejiri et al. | |
| 6,895,126 B2* | 5/2005 | Di Bernardo et al. | 382/284 |
| 6,904,160 B2 | 6/2005 | Burgess | |
| 6,919,892 B1 | 7/2005 | Cheiky et al. | |
| 6,963,657 B1 | 11/2005 | Nishigaki et al. | |
| 6,985,638 B1 | 1/2006 | Aoki | |
| 6,985,929 B1 | 1/2006 | Wilson et al. | 709/217 |
| 7,027,054 B1 | 4/2006 | Cheiky et al. | |
| 7,050,102 B1 | 5/2006 | Vincent | |
| 7,092,548 B2 | 8/2006 | Laumeyer et al. | |
| 7,139,422 B2 | 11/2006 | Hauck et al. | |
| 7,171,058 B2 | 1/2007 | Luo | |
| 7,174,301 B2 | 2/2007 | Florance et al. | |
| 7,181,081 B2 | 2/2007 | Sandrew | |
| 7,225,207 B1 | 5/2007 | Ohazama et al. | |
| 7,239,760 B2 | 7/2007 | Di Bernardo et al. | |
| 7,254,271 B2 | 8/2007 | Arcas | |
| 7,305,365 B1 | 12/2007 | Bhela et al. | |
| 7,317,558 B2 | 1/2008 | Chiba | |
| 7,324,666 B2 | 1/2008 | Zoken et al. | |
| 7,444,003 B2 | 10/2008 | Laumeyer et al. | |
| 7,457,706 B2 | 11/2008 | Melero et al. | 702/5 |
| 7,467,356 B2 | 12/2008 | Gettman et al. | |
| 7,475,060 B2* | 1/2009 | Toyama et al. | |
| 7,573,488 B2 | 8/2009 | Freyhult | |
| 7,577,316 B2 | 8/2009 | Di Bernardo et al. | |
| 7,599,988 B2 | 10/2009 | Frank | 709/203 |
| 7,619,626 B2 | 11/2009 | Bernier | |
| 7,659,915 B2 | 2/2010 | Kurzweil et al. | |
| RE41,175 E | 3/2010 | Vashisth et al. | 342/357.31 |
| 7,698,212 B1 | 4/2010 | Peirson et al. | |
| 7,702,821 B2 | 4/2010 | Feinberg et al. | |
| 7,746,343 B1 | 6/2010 | Charaniya et al. | 345/428 |
| 7,747,526 B1 | 6/2010 | Palumbo et al. | |
| 7,777,740 B2 | 8/2010 | Lee | |
| 7,805,025 B2 | 9/2010 | Di Bernardo et al. | |
| 7,813,596 B2 | 10/2010 | Di Bernardo et al. | |
| 7,933,395 B1 | 4/2011 | Bailly et al. | 379/201.04 |
| 7,978,970 B2 | 7/2011 | Pastore | |
| 7,990,394 B2 | 8/2011 | Vincent et al. | |
| 7,999,848 B2 | 8/2011 | Chew | |
| 8,042,056 B2 | 10/2011 | Wheeler et al. | 715/764 |
| 8,050,521 B2 | 11/2011 | Judelson | |
| 8,051,089 B2* | 11/2011 | Gargi et al. | 707/758 |
| 8,111,307 B2 | 2/2012 | Deever et al. | |
| 8,180,539 B2 | 5/2012 | Kojima et al. | |
| 8,195,386 B2 | 6/2012 | Hu et al. | |
| 2002/0047895 A1 | 4/2002 | Di Bernardo et al. | |
| 2002/0101426 A1 | 8/2002 | Okamura | |
| 2003/0063133 A1* | 4/2003 | Foote et al. | 345/850 |
| 2003/0210806 A1 | 11/2003 | Yoichi et al. | |
| 2004/0024709 A1 | 2/2004 | Yu et al. | 705/43 |
| 2004/0061774 A1 | 4/2004 | Wachtel et al. | |
| 2004/0143543 A1 | 7/2004 | Goldman | |
| 2004/0177373 A1 | 9/2004 | Kawabe et al. | |
| 2004/0196282 A1 | 10/2004 | Oh | |
| 2005/0128212 A1 | 6/2005 | Edecker et al. | |
| 2005/0270288 A1 | 12/2005 | Arcas | 345/428 |
| 2006/0059073 A1 | 3/2006 | Walzak | |
| 2006/0155570 A1 | 7/2006 | Almeida et al. | |
| 2006/0155594 A1 | 7/2006 | Almeida et al. | |
| 2008/0113672 A1 | 5/2008 | Karr et al. | 455/456.1 |
| 2008/0120215 A1 | 5/2008 | Wagner | |
| 2010/0004995 A1 | 1/2010 | Hickman | |
| 2010/0122208 A1* | 5/2010 | Herr et al. | 715/799 |

OTHER PUBLICATIONS

A. Roman, et. al, "Interactive Design of Multi-Perspective Images for Visualizing Urban Landscapes", IEEE Visualization Oct. 10-15, 2004, Austin Texas, pp. 537-544.

Christian Fruh, Avideh Zakhor, An Automated Method for Large-Scale, Ground-Based City Model Acquisition, International Journal of Computer Vision, 5-24, 2004.

Don Kimber, Jonathan Foote, and Surapong Lertsithichai, "FlyAbout: Spatially Indexed Panoramic Video". Multimedia '01 Proceedings of the ninth ACM international conference on Multimedia. New York 2001. pp. 339-347.

Mitsunori Yoshimura, Ryosuke Shibasaki, Tetsujo Anai, and Hirofumi Chikatsu, "Ground Based Sensor Integration for Spatial Data Acquisition and Database Development". International Archives of Photogrammetry and Remote Sensing. vol. XXXIII, Part B5. Amsterdam 2000. pp. 933-936.

\* cited by examiner

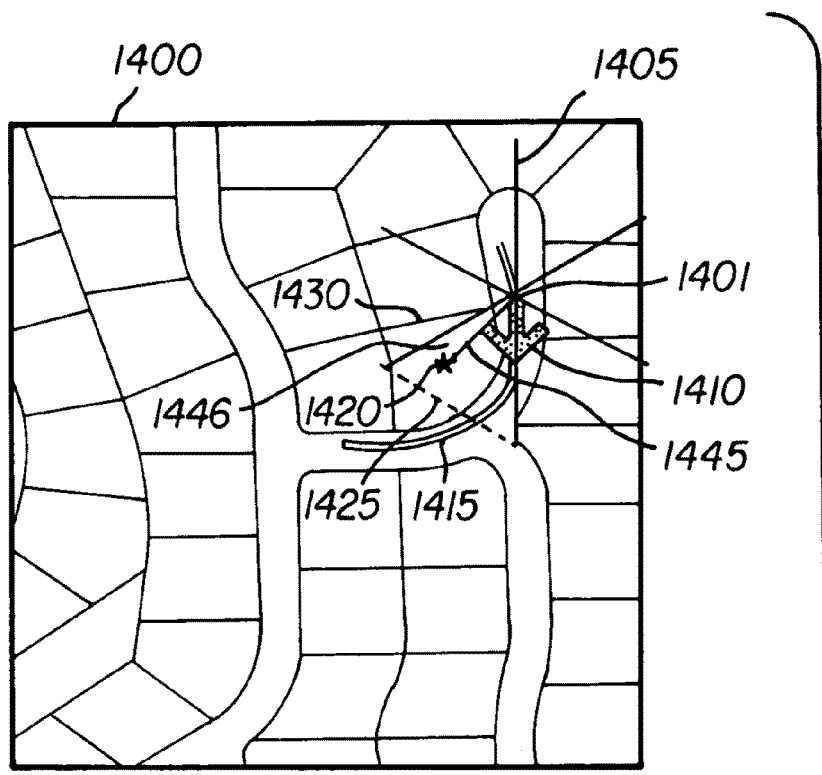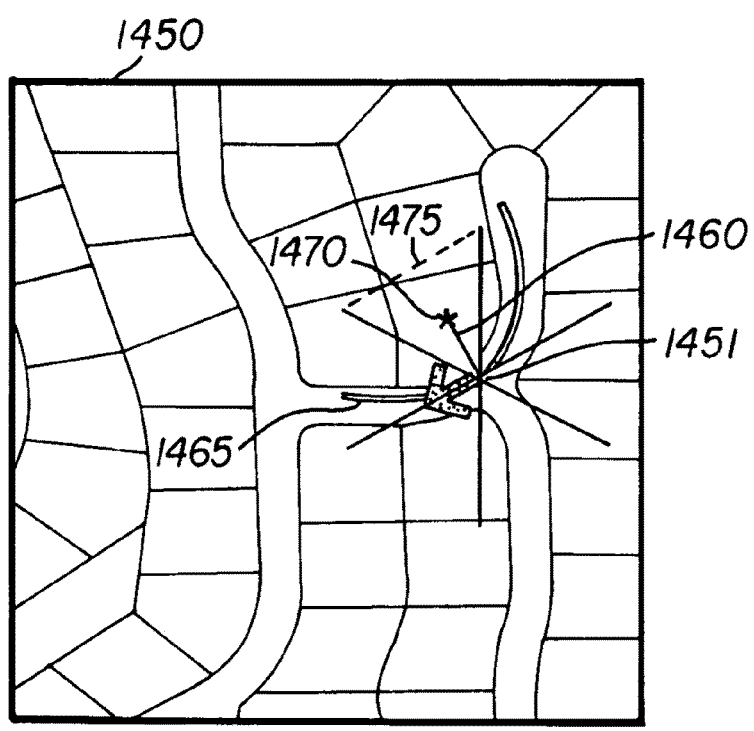
FIG. 13

METHOD OF PROVIDING STREET VIEW DATA OF A REAL ESTATE PROPERTY

CROSS REFERENCE TO RELATED APPLICATION

This application is a continuation of, and claims priority under 35 U.S.C. §120 from, nonprovisional U.S. patent application Ser. No. 13/481,912 entitled "Three Dimensional Image Data Models," filed on May 28, 2012. Application Ser. No. 13/481,912, in turn, is a continuation of, and claims priority under 35 U.S.C. §120 from, nonprovisional U.S. patent application Ser. No. 12/036,197 entitled "Methods and Apparatus for Generating Three-Dimensional Image Data Models," filed on Feb. 22, 2008, now U.S. Pat. No. 8,207,964. Application Ser. No. 12/036,197, in turn, is a continuation-in-part of, and claims priority under 35 U.S.C. §120 from, nonprovisional U.S. patent application Ser. No. 11/216,465 entitled "Apparatus and Method for Producing Video Drive-By Data Corresponding to a Geographic Location," filed on Aug. 31, 2005, now U.S. Pat. No. 7,389,181. Application Ser. No. 11/216,465, in turn, claims priority under 35 U.S.C. §120 from provisional U.S. patent application Ser. No. 60/605,498 entitled "Apparatus and Method for Producing Video Drive-By Data Corresponding to a Geographic Location," filed on Aug. 31, 2004. The subject matter of each of the foregoing documents is incorporated herein by reference.

TECHNICAL FIELD

The present application relates in general to systems and methods of generating image data of a geographic location of interest. Specifically, the invention relates to generating video drive-by data corresponding to a selected geographic location. The video drive-by data provides a street level view of a neighborhood surrounding the selected geographic location, and can be further combined with other data sources in a variety of applications. The invention also relates to generating data descriptive of a continuum of images, such as those comprising a geographic setting.

BACKGROUND INFORMATION

Companies and individuals looking for real estate to rent, buy, insure or finance have historically had to physically travel to the property in order to visually verify the condition of the property. With the advent of the Internet, it has become possible for individuals to view photographs of properties on-line in the comfort of their home or office. One such example is the MLS (Multiple Listing Service) database, which can be accessed by the public through Internet sites such as www.realtor.com. The MLS database typically includes one or more photographs and additional data regarding the property such as the number of bedrooms and the square footage. More advanced systems may include short video clips constituting virtual tours of the property in question. While such systems may also show views of a property from the street, they do not give a user a sense of the neighborhood in which the property is located. Accordingly, in order to determine if the area surrounding the property of interest is desirable, a user may often be required to physically travel to the property in order to view the state of the neighborhood.

In order to overcome the deficiencies of present systems of the type described above, it would be desirable to provide a system that would enable a user to view the surrounding neighborhood as well as the property itself. Such a system would enable the creation of a complete online database of street-level video data, hereinafter referred to as "video drive-by" data, which can be made available to end users via the Internet. Preferably, the video data would be encoded with GPS coordinates as well as conventional street addresses and map coordinates to provide instant street level video of any location upon request. For example, such a system would be extremely useful if a user could query the system by submitting GPS coordinates, street addresses or by "clicking" on a map overlay showing streets in the desired neighborhood.

The ability of a system to provide data associated with the neighborhood, as well as a particular property in question, would be extremely desirable in a number of government and commercial applications. Aiding in the process of appraising a property, for example, is just one application in which such a system can provide benefits. Mortgage lenders currently purchase several types of appraisal products as part of their financing decision process. The lowest cost appraisal is an automated valuation model (AVM), whereby county parcel data of subject property can be compared to the county parcel data of a list of nearby properties (called "comps" which is short for comparables) with a similar lot size, square footage, and amenities (such as waterfront access). A comp list typically includes average per square foot calculations of the similar properties that enables the creation of approximate value of the subject property. The next lowest cost appraisal is a Desk Review whereby an appraiser reviews the AVM data on behalf of the mortgage company and evaluates the relevance of the data presented in the AVM in conjunction with what they personally know regarding the area the subject is located in. A separate class of field appraisals includes both a Drive By Appraisal and a Full Interior Appraisal. A Drive By Appraisal is where an appraiser drives by and shoots a photograph from the street of a subject property and it's comps. These photographs are linked to county parcel data and AVM calculations to provide a more accurate report to the mortgage company. Finally, for a Full Interior Appraisal which is the most expensive and considered most accurate appraisal, an appraiser will tour the interior of a property taking numerous photographs, measuring and sketching a floor plan as well as notating the general quality of construction and upkeep, this data is then presented as a multi property report which includes tabular data of subject and comp data with comp photos.

In the case of three of four appraisal types, however, a mortgage banker must wait several days before receiving the information from an appraiser. If a system were available to allow quick access to all properties within a neighborhood, a mortgage banker could obtain photographs of a subject property and its comps and confirm that the comparables as selected by the AVM represents properties that have the same visual appearance of the subject property, thereby providing faster loan commitments and closings while at the same time lowering costs. Similarly, instant Drive By Appraisals could be provided thereby eliminating the costs and delays associated with an appraiser driving to manually photograph a subject property and its comps.

Images of geographic areas created on a local basis have been created in numerous formats. Photographs, movie cameras, video camera recorders, and more recently digital recorders have all been utilized to capture moving images of a geographic parcel. Photographs can be useful because they are easily associated with a particular real estate parcel; however, they are limited in the scope of the subject matter that they can include. In addition, photographs must be manually acquired and docketed in order to be associated with a property and subsequently retrieved. Panoramas can increase the scope of the subject matter to a point, but are limited by a point of capture of the panoramic views.

Movie cameras, video recorders and digital recorders and other "motion pictures" provide for increased scope of image capture. However, it is sometimes difficult to locate and view a particular portion of interest of images captured as motion pictures. In addition, correlation of particular portions of a motion picture with a particular real estate parcel can be difficult if the motion picture includes more than one real estate parcel. For example, it is relatively difficult to locate and view a particular real estate parcel in the context of its neighborhood setting, or particular aspects of its setting. Aerial images, such as satellite pictures of geographic areas have also been captured, and specific parcels of land or landmarks can be located on the aerial images.

In addition, methods and apparatus have been known for generating point clouds and generating representations of particular objects from processing of the point clouds.

However, prior to the present invention, there has not been a mechanism for generating a continuum of object representations based upon point cloud data. Nor has there been a mechanism for accurately correlating ground level images with substantial portions of an aerial image in a consistent and orderly format that allows for the identification of a particular parcel of land and provide both aerial and ground level views of the parcel, as well as a surrounding area of the parcel. Similarly, prior to the present invention, there has not been a method for correlating geopolitical indicators, such as property lot lines, or tax map parcels with aerial images and ground level video images.

Substantial portions of ground level images have not been correlated with aerial images or with geopolitical indicators, in part, because there has not been any image vehicle capable to providing a format of high quality and accurate representations of street level images capable of being matched to macro level image data.

SUMMARY

A system and method of providing video drive-by data is provided to enable a street level view of a neighborhood surrounding a selected geographic location. The video drive-by data can be further combined with other data sources related to the geographic location.

The invention is based, in part, on providing: 1) accurate differential GPS data; 2) post processing of geo positioning signals to smooth curves in motion (splines); 3) highly accurate camera position and video frame position analysis processing to provide a calculation of the exact position of each video frame; 4) parcel data processing that analyses vector line data that is geo-coded with latitude and longitude values; 5) digital image photos processed with image superimposition algorithms; and 6) a database that includes video image files, parcel latitude and longitude data, and positioning data that is indexed to the video image files. With these components, the invention enables the access to video images of any desired geographic location and its surrounding neighborhood, while relating such image data to other property related data such as property lines, landmarks, etc.

In a preferred embodiment, a system is provided that includes a video and data server farm. The video and data server farm includes at least one video storage server that stores video image files containing video drive-by data that corresponds to a geographic location, a database server that processes a data query received from a user over the Internet that corresponds to a geographic location of interest, and an image server. In operation, the database server identifies video image files stored in the video storage server that correspond to the geographic location of interest contained in the data query, and transfers the video image files over a pre-processing network to the image processing server. The image processing server converts the video drive-by data to post-processed video data corresponding to a desired image format, and transfers the post-processed video data via a post-processing network to the Internet in response to the query. A landing zone server is preferably provided to receive the video drive-by data from a portable memory device and permit the viewing and analysis of the video drive-by data prior to storage in the video storage server. Still further, a map server is preferably provided to present a static image of an overhead view of the geographic location of interest.

The video drive-by data is preferably captured by a video capture system that includes a camera array that generates video image data of a neighborhood corresponding to a geographic location, a positioning unit that produces positioning data corresponding to the location of the camera array, and a processing unit that processes the video image data and positioning data to produce the video drive-by data. The processing unit stores the video drive-by data on the portable memory device. In a preferred embodiment, the camera array includes a plurality of camera units arranged to provide a 360 degree view of the neighborhood. Further, the processing unit preferably provides time stamp data and file pointer data that permits synchronization of video images to precise locations of individual frames.

The above-described system can further be provided with a plurality of processing means to add additional features or permit utilization of the system for specific applications. For example, processing means may be incorporated to provide a variety of geo-coded data layers in conjunction with the video drive-by data. Similarly, processing means can be provided for: creating geo-coded text, image and vector data which is superimposed onto the post-processed video data that is transferred to the Internet; linking latitude and longitude data with video drive-by data; calculating a camera position of designated individual frames of video drive-by data using position data points captured before and after a designated frame position; for examining changes of relative position in the horizontal position of designated landmarks in a sequence of video image frames to create fixed landmark data points; examining images that match common image patterns to enable the creation of an accurate vector map of roads; providing OCR processing to generate a database of recognized text that is geo-coded with latitude and longitude coordinates based on camera orientation and relative position; and selecting video drive-by data or a given street address by calculating a centroid of a parcel and determining camera orientation and position to enable highly accurate delivery of video that is pointed toward the centroid of a parcel.

Still further embodiments can include: processing means by which a sequence of video frames that are oriented toward a designated parcel and it's adjacent parcels can be stitched together to form a long horizontal image of a street which can be created with superimposed property county parcel data placed above the centroid of the parcel centered above the property; processing means for providing authenticated annotation of information or comments to a photo and or video; processing means for uploading a digital image photograph to the video and data server farm and comparing the uploaded photo to a library of images captured by the video capture system; and/or processing for comparing digital image photos of building structures to generate a set of numeric values representing line segments of sharp horizontal, vertical and angular lines that are stored as vectors each with common ratios of distances from each other, wherein the list of vector line segments can be searched with a high-speed database query to generate a list of possible matches of a subject property against a large database of properties with vector line data on file.

The present invention can be utilized in a variety of applications. For example, a system in accordance with the invention can offer invaluable assistance to local, county or state road and highway departments in planning new projects or tracking existing placements of signage, traffic signals, utility boxes, and other facilities and equipment locations. Administrators can preview and familiarize themselves with a targeted location in conjunction with assessing needs or assigning work details.

New layers of routing assistance can also be provided to emergency vehicle dispatching systems by including roadside views to allow rapid and accurate targeting of a destination. Tied in directly to county GIS mapping, the present invention can offer street level video into the neighborhood and directly to the street address, offering photographs of any property transmitted via wireless Internet to help the fire, police or rescue driver find his or her way.

With the capability to fully integrate, refine and unify existing county property records and GIS mapping resources, the system can enhance online presentations with parcel line enhanced ortho imagery, property images and now with video. Further, with the system, unification of property records and county mapping can evolve to tie in to one-click access to street level video segments allowing a user to virtually drive down any street, while highlighting any property and its surrounding neighborhood with parcel lines drawn on the photograph.

Still further, local development agencies wanting to attract business and industrial relocations to their communities can insure an edge over competing community bids by offering one-click access to visually tour planned growth areas. Using integrated aerial mapping, property data and data generated by the system, users can scout available development areas, accessing integrated mapping layers to identify a development area's proximity to rail, highways, air and port facilities, while also including street level video footage of local amenities, residential neighborhoods, schools, recreation and other visual explorations.

Similarly, tourism boards at any level can promote travel and recreation to a broader audience by integrating visuals and streaming video in presenting points of interest, accommodations, and dining as integrated layers to the local, county or state map that are unified to promotional content. The video drive-by data generated by the system can offer compelling video segments highlighting parks, beaches, hunting, fishing, arena sports, museums and places of historical interest; while, also providing directions, drive maps, and links to information detailing places to stay, restaurants, rental agencies and more.

In non-governmental applications, the system can be utilized to communicate the value and desirability of a new subdivision or location to potential builders and residents. For example, a property developer's web site can be switched on to enable parcel line enhanced satellite photography with access to street level video data of the newly paved roads of the development. Web site visitors would have the freedom of taking a virtual tour of any selected parcel of property, looking around to note the scenery, tree line, and proximity to neighboring lots, thereby providing a true feel for the land within its natural surroundings. Data and content can be integrated to any parcel with a ready feedback mechanism allowing viewers to inquire further or request an appointment.

Similarly, property appraisers can gain new efficiencies at reduced costs by utilizing a video drive-by data archive of streaming street level video to select and capture freeze-frame video images of homes for sale needing an exterior photo. The system's unification of property data, MLS records, mapping with the video resources allows any property to be quickly selected, analyzed, and compared to equivalent property listings, generating reports with active links to both data and visuals that can be emailed at a moments notice.

The present invention also relates to methods and apparatus of generating image data. More specifically, the present invention also relates to generating data descriptive of a continuum of three dimensional images, such as those comprising a geographic landscape. Accordingly, the present invention provides methods and apparatus for generating a continuum of three dimensional image data. In some embodiments, the continuum of three dimensional image data provides a street level representation of geographic locations. Two or more sets of image data are captured of a subject area, wherein each of the two or more images are captured from disparate points on a continuum In another embodiment, methods and apparatus are provided for generating a three dimensional output that includes a continuum of image data sprayed over three-dimensional models. The three-dimensional models can be representative of features captured by the image data, wherein image data can be captured at multiple disparate points along another continuum. The user interface can also include multiple modalities of image data and statistical analysis of the image data.

Yet other embodiments provide methods and apparatus for generating a continuum of image data. The continuum of image data provides a two dimensional ribbon of street level views of geographic areas. The ribbons are created by capturing two or more images of a subject, wherein each of the two or more images are captured from disparate points on a continuum. For example, each of the two or more images can be captured from a different position on a street as a vehicle drives down the street. Generally, the images will be captured from an orthogonal view of the subject.

Portions of the two or more images are then aligned in a dimension consistent with the continuum, wherein, according to our example the continuum includes the path of the vehicle. Therefore, the images would be aligned in a dimension consistent with the path of the vehicle. A composite image of the subject is generated from the aligned portions of the two or more images.

In some embodiments, positional data is recorded that is descriptive of a respective location of each of the two or more images. The positional data can include, for example, latitude and longitude coordinates and can be used to associate the composite image with a particular portion of the subject. It is also within the scope of the invention to record the altitude of a camera used to capture the image data and thereby approximating the altitude of the subject matter of the image data.

In some embodiments, a camera will be maintained approximately orthogonal to the subject captured and therefore, those embodiments will maintain the camera at an angle about between 75° and 105° in relation to the subject matter.

In another aspect, some embodiments can include various overlays of information on top of the continuum of image data. Overlays can include one or more of: metadata, data related to a composite image, and geospatial information.

Other advantages, features and applications of the invention will become apparent to those skilled in the art from the following detailed description of the preferred embodiments of the invention and the accompanying drawings.

BRIEF DESCRIPTION OF THE DRAWINGS

The invention will be described in detail with reference to certain preferred embodiments thereof and the accompanying drawings, wherein:

FIG. 13 illustrates two ortho views of a Video Capture System as it drives in a direction of travel along a path past a selected parcel where one of six possible cameras may be viewing a subject property;

DETAILED DESCRIPTION

Figure 1:
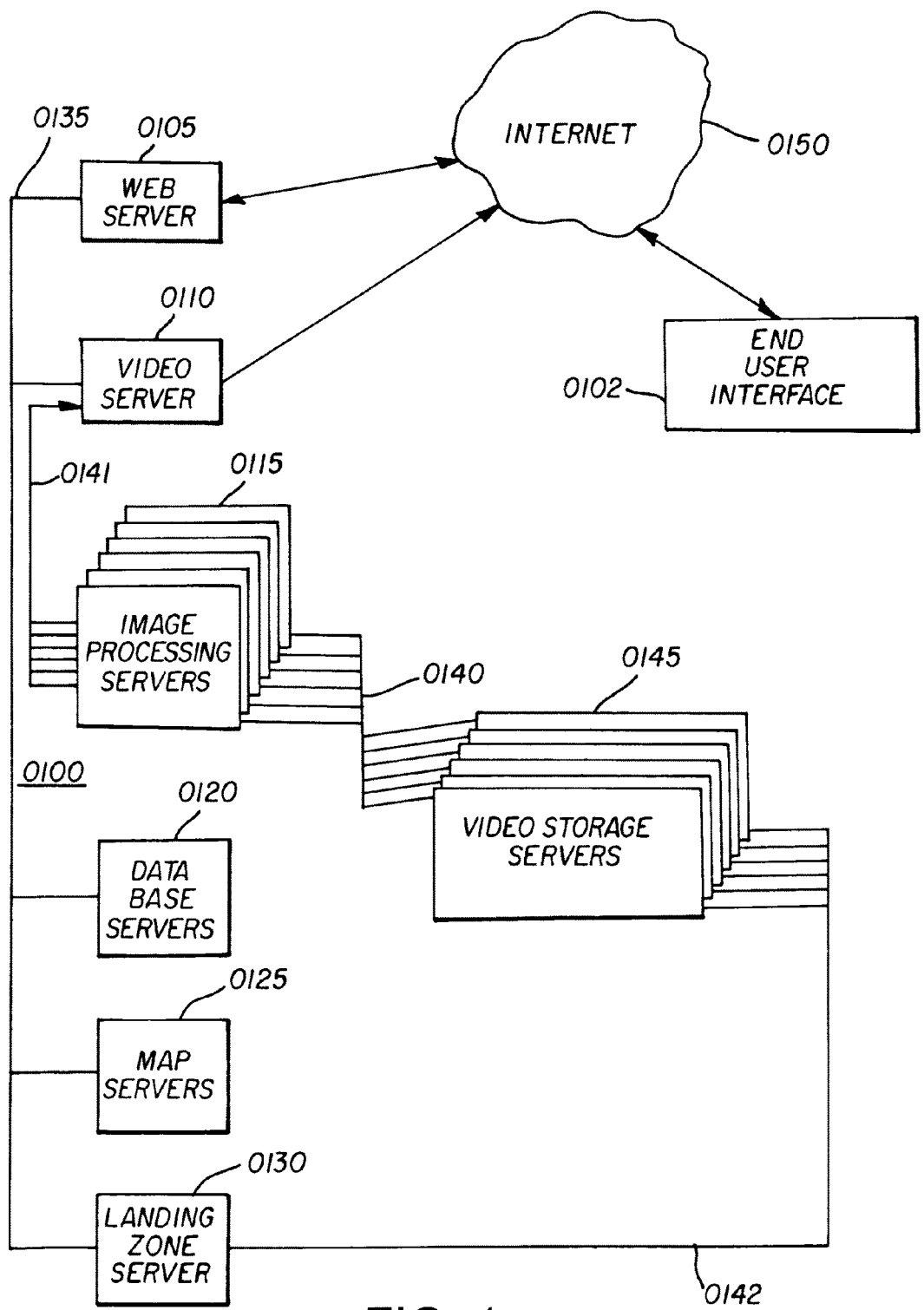
FIG. 1 is a schematic diagram of a Video and Data Server Farm in accordance with a preferred embodiment of the invention.

A Video & Data Server Farm 0100 in accordance with a preferred embodiment of the invention is illustrated in FIG. 1. The Video & Data Server Farm 0100 utilizes a set of servers to provide digital storage of video drive-by data, and processes the video drive-by data for delivery to an end user. The video drive-by data preferably includes video data and Global Positioning System (GPS) data or "geo position data" generated by a Video Capture System 0201 illustrated in FIG. 2. Specifically, video drive-by data is preferably stored on an external hard disk drive (HDD) 0250 of the Video Capture System 0201, and is then copied from the external HDD 0250 to a landing zone server 0130 of the Video & Data Server Farm 0100 for quality analysis and viewing via industry standard commercially available MPEG2 viewing software and file editors. The Video drive-by data, including the video data and GPS data, is transferred via a load network 0142 to be stored as video image files in video storage servers 0145 of the Video & Data Server Farm 0110.

In operation, a user logs onto the Internet 0150 via an end user interface 0102 to access the video image files containing the converted video drive-by data via a data query that includes data related to a specific geographic location of interest. The data query received by a web server 0105 and carried over a control network 0135 to a database server 0120 and a map server 0125, which preferably calculates and presents a static image (for example a street map image) of an overhead view of the geographic location of interest. The database server 0120 identifies the appropriate video image files corresponding to the location of interest from the video storage servers 0145 for transfer over a pre-processing network 0140 to image processing servers 0115. The image processing servers 0115 convert the original video drive-by data to one of many potential new image formats (depending on the particular application) which constitute Post-processed Video Data (PPVD). The PPVD is then transferred to a video server 0110 over a post-processing network 0141, which then forwards the PPVD data to the Internet 0150 in response to the query. In addition, if so desired, the video server 0110 can also concurrently transfer the PPVD back to the video storage servers 0145, database servers 0120 and map server 0125 for future access from a video cache.

Figure 2:
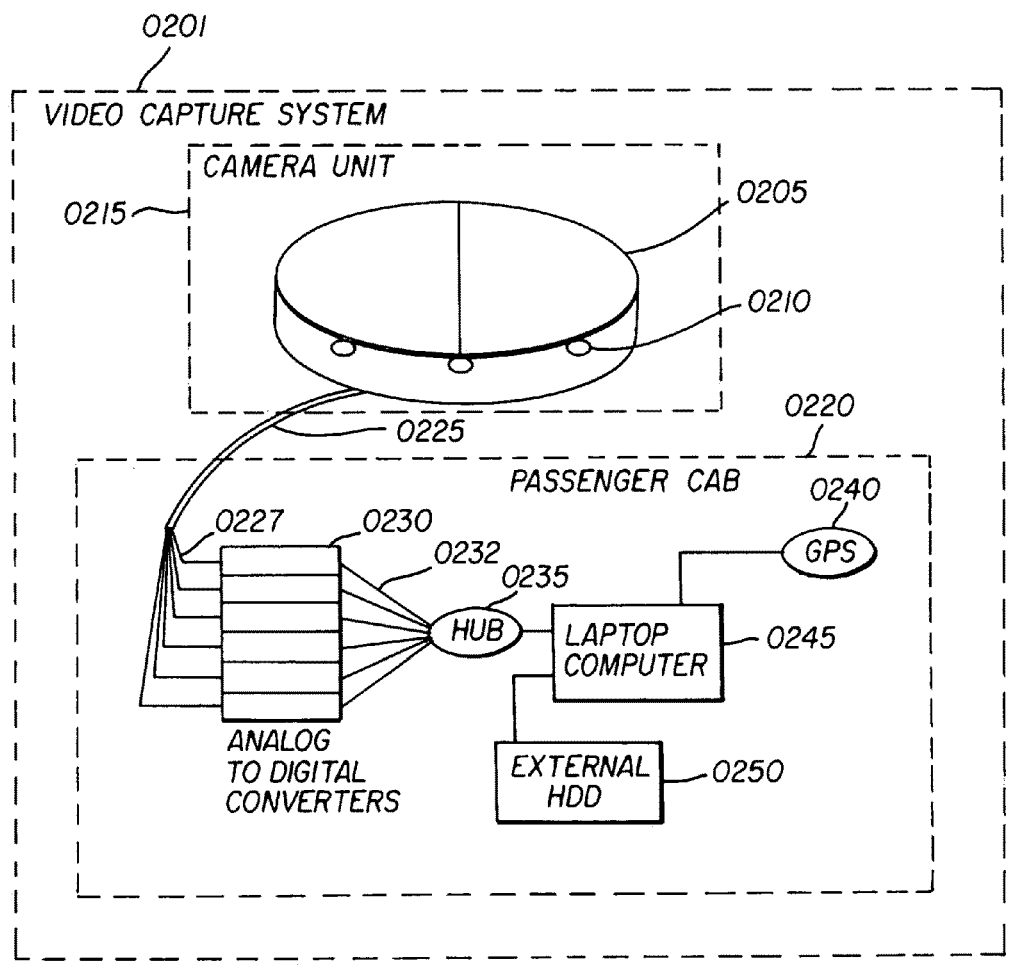
FIG. 2 is a schematic block diagram of a Video Capture System that supplies video data and corresponding synchronous GPS data to the Video and Data Server Farm illustrated in FIG. 1.

FIG. 2 is a schematic block diagram of the components in the Video Capture System 0201. In a preferred embodiment, a camera unit 0205 preferably containing six video cameras 0210 in a hexagonal array is provided in a camera housing assembly 0215. The camera housing assembly 0215 is mounted with differing configurations on top of a vehicle (not shown) preferably using commercially available roof racks and straps. The electronics for converting and storing the video data out of the camera 205 are preferably provided in a passenger cab 0220 of the vehicle. The Video Capture System 0201 is preferably powered from the vehicles electrical system, although a separate power source can be provided if so desired. The camera 0205 feeds analog video signals 0227 along six cables in a cable harness 0225 which is fed through a small opening in a window of the vehicle. The analog video signals 0227 are fed into six analog-to-digital (A/D) converters 0230, which convert the analog video signals 0227 to compressed digital video data. The compressed digital video data is then sent on data cables 0232 into a seven port USB hub 0235. The six streams of digital video data are fed via the hub 0235 into a laptop computer 0245, which preferably writes the digital video data onto a portable storage device, for example the external HDD 0250, simultaneously with the data from a GPS receiver 0240. Accordingly, the data is stored with corresponding GPS synchronized coordinates in the external HDD 0250 as the Video drive-by data.

Figure 3:
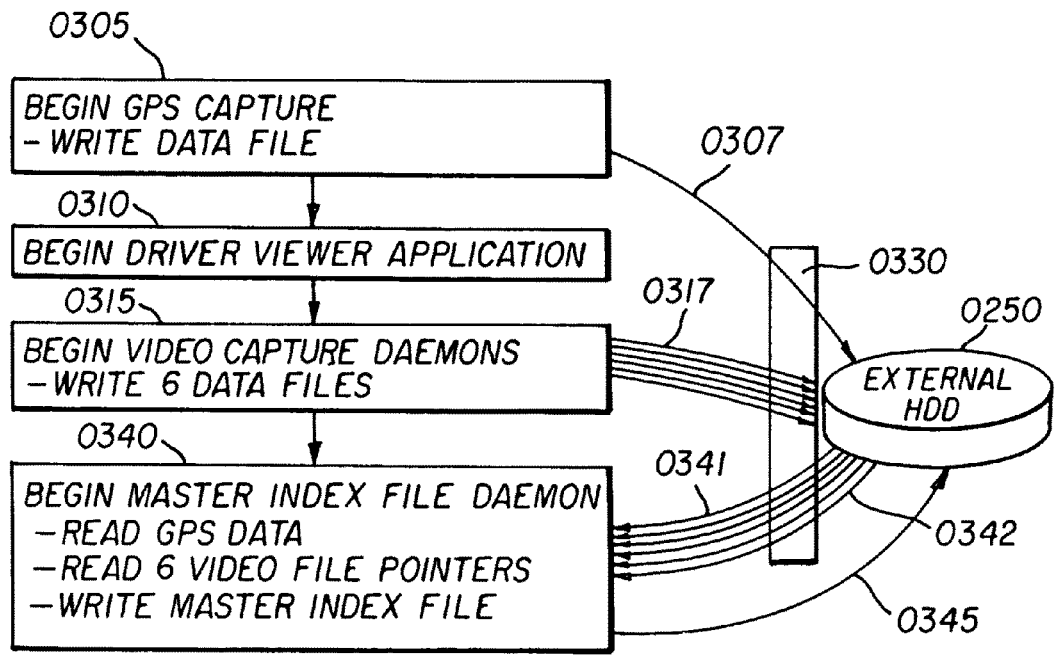
FIG. 3 is a process flow diagram illustrating the process of capturing the video data and synchronous GPS data utilized by the Video Capture System illustrated in FIG. 2.

FIG. 3 is the block diagram illustrating the process of capturing the video data and synchronous GPS data to create the video drive-by data. A set of programs is automatically launched when power is applied to the laptop computer 0245. The GPS capture program 0305 processes the data transmitted from the GPS receiver 0240 and writes 0307 this as time stamped data to the laptop computer's RAM 0330 and to a file on the external HDD 0250. The time stamp of the data file written contains the laptop computer's internal system clock time data as well as the GPS clock data. A driver viewer application 0310 is initialized to enable the driver of the vehicle to confirm that the GPS receiver 0240 is working, and—as the video data is captured—the driver can preferably view segments of the video data on the display of the laptop computer 0245 to confirm the system is working properly. The driver viewer application 0310 shows a map of roads with color codes representing areas that have already been surveyed in one color and streets that need to surveyed in a second color.

Video capture daemons 0315 are started to process the video drive-by data arriving via the USB hub to then write 0317 the six data files to the external HDD 0250 with the laptop computer's 0245 system time clock time stamp data and file pointer data added to the video file and a GPS log file. In addition, the video capture daemons writes 0317 the file pointer data to the laptop computer's RAM 0330 for use by a master index file. The master index file daemon 0340 is started which reads the GPS data, the six video file pointers values and then writes 0345 the master index file data to the external HDD 0250. The entire set of data is then copied to the landing zone server 0130 when the external HDD drives are sent to the Video & Data Server Farm 0100 for upload and processing as will be described in greater detail below.

Figure 4:
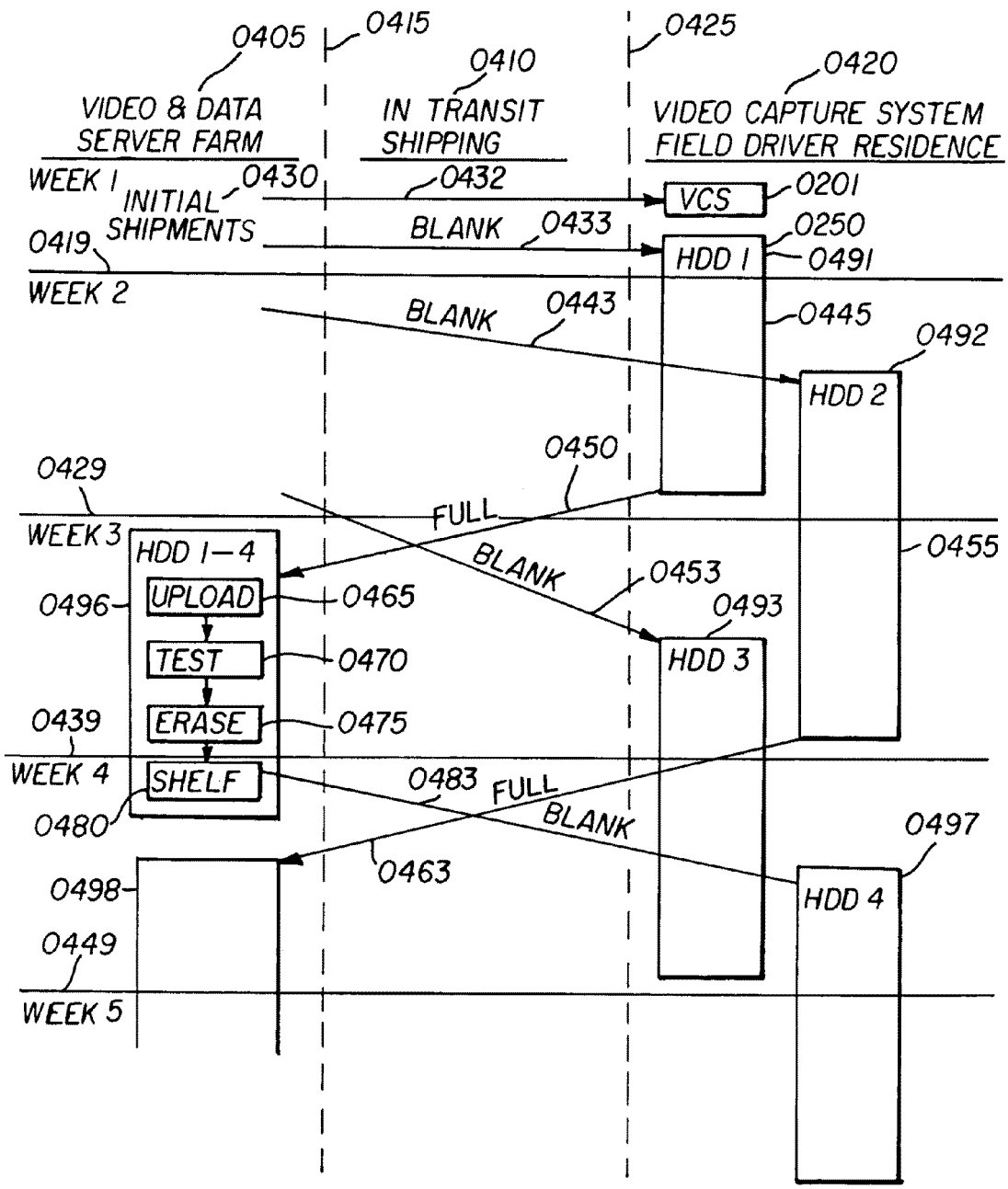
FIG. 4 is a process flow diagram illustrating an efficient process in accordance with the present invention by which numerous field drivers with Video Capture Systems of the type illustrated in FIG. 2 can be continually supplied with hard disk drives to capture data.

FIG. 4 is a process flow diagram illustrating a preferred efficient process by which numerous field drivers with video capture systems can be continually supplied with hard disk drives to capture data. The figure is comprised of three columns 0405, 0410 and 0420 separated by dashed lines. The left column 0405 entitled "Video & Data Server Farm" represents the location of the Video & Data Server Farm 0100 where all data is stored and subsequently delivered to the Internet 0150. The middle column 0410 entitled "In Transit Shipping" represents the movement of data in external hard disk drives 0250 via commercial shipping companies. The right column 0420 entitled "Video Capture System Field Driver Residence" represents one of many locations where drivers in the field handle external hard disk drives for receiving, installing and shipping.

In the illustrated example, time movement is indicated along the vertical axis in a downward direction with the start of the process at the top indicated as Week 1. For example, the end of Week 1 is represented by a horizontal line 0419. During Week 2, represented as the time between the lines 0419 and 0429, a shipment 0443 of blank external hard disk drives 0445 is moved from Video & Data Server Farm 0405 to the Video Capture System Field Driver Residence 0420. The angle of the line in the downward direction to the right illustrates the time delay of several days as the external hard disk drives 0445 are physically moved by a commercial shipping company or private shipping means specifically set up for operation of the system.

The process starts with an initial shipment 0430 of a Video Capture System through In Transit Shipping process path 0432 to individual drivers in the field for installation in their respective vehicles. A blank external HDD is then shipped in process path 0433 to the individual drivers in their respective Field Driver Residence for installation into the Video Capture System. The external HDD 0250 is illustrated as several unique external hard disk drives as they change state and use as they move through various stages of processing. For example, the first external hard disk drive labeled as HDD1 0440 is shipped blank to the Field Driver Residence where it is installed. During Week 2, a driver drives along selected roads capturing video data and GPS data which is then written onto the HDD1 as illustrated with the wavy line 0445. During Week 2, a second blank external hard disk drive HDD2 0492 is shipped 0443 to the field driver where it sits in inventory waiting for use. At the end of Week 2, the driver ships 0450 the first full HDD1 0491 to the Video & Data Server Farm for processing. At the beginning of Week 3 0429, the first HDD1 0491 is now re-labeled as HDD1-4 in the landing zone upload process 0496 carried out at the Video & Data Server Farm.

In the landing zone upload process 0496, the data is copied 0465 to the landing zone server and a GPS.LOG and a Master Index File data is loaded to the map server. An operator is given an opportunity to review the data using video file viewing software to provide a visual quality review test process 0470. Once the quality review process 0470 is completed, the operator then erases 0475 the data from the external HDD and places the external HDD drive on the inventory shelf 0480 labeled as HDD4.

At the beginning of Week 3, the field driver installs HDD2 0492 into the video capture system and starts driving only a survey route to capture video data which is then stored 0455. Later in Week 3, the field driver receives a blank HDD3 0493 which is stored at the field driver residence until it is needed at the beginning of Week 4 0439. The driver completes the capture process at the end of Week 3 0439 and ships 0463 HDD2 0492 to Video & Data Server Farm 0405, at which point the landing zone upload process is repeated 0498. The above-described process provides a simple yet efficient method of moving large amounts of data from the field driver residence back to the Video & Data Server Farm.

Figure 5:
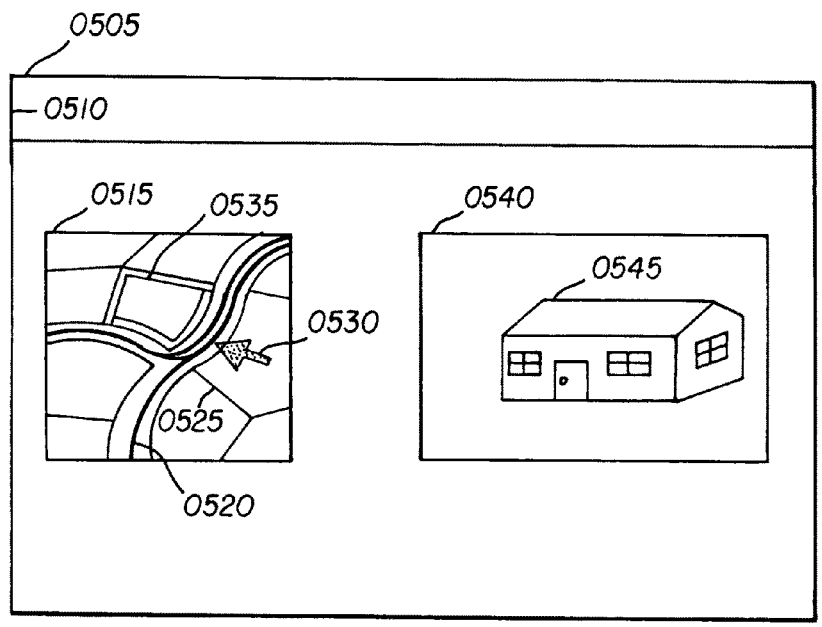
FIG. 5 illustrates a web browser view with an address bar pointing to a web page that shows both an ortho image view of a mapserver and video pane in accordance with the invention.

The processes for accessing and viewing data will now be described in greater detail. FIG. 5, for example, illustrates a web browser 0505 view with an address bar 0510 pointing to a web page that shows both an ortho image view 0515 of a mapserver and video pane 0540. In the ortho image view 0515, drive line layers 0520 are shown representing the GPS coordinates as a map layer on top of parcel lines 0525 with an end users mouse cursor 0530 pointing to the selected area of video that the user wants to see in the video pane 0540. In this way, a user can select a parcel 0535, indicated with the double lines, and then the system can show a video view of the property 0545 in the video pane 0540. With this type of interface, a user can simultaneously view both conventional street map representations as well as the street level Video drive-by data generated by the system.

Figure 6:
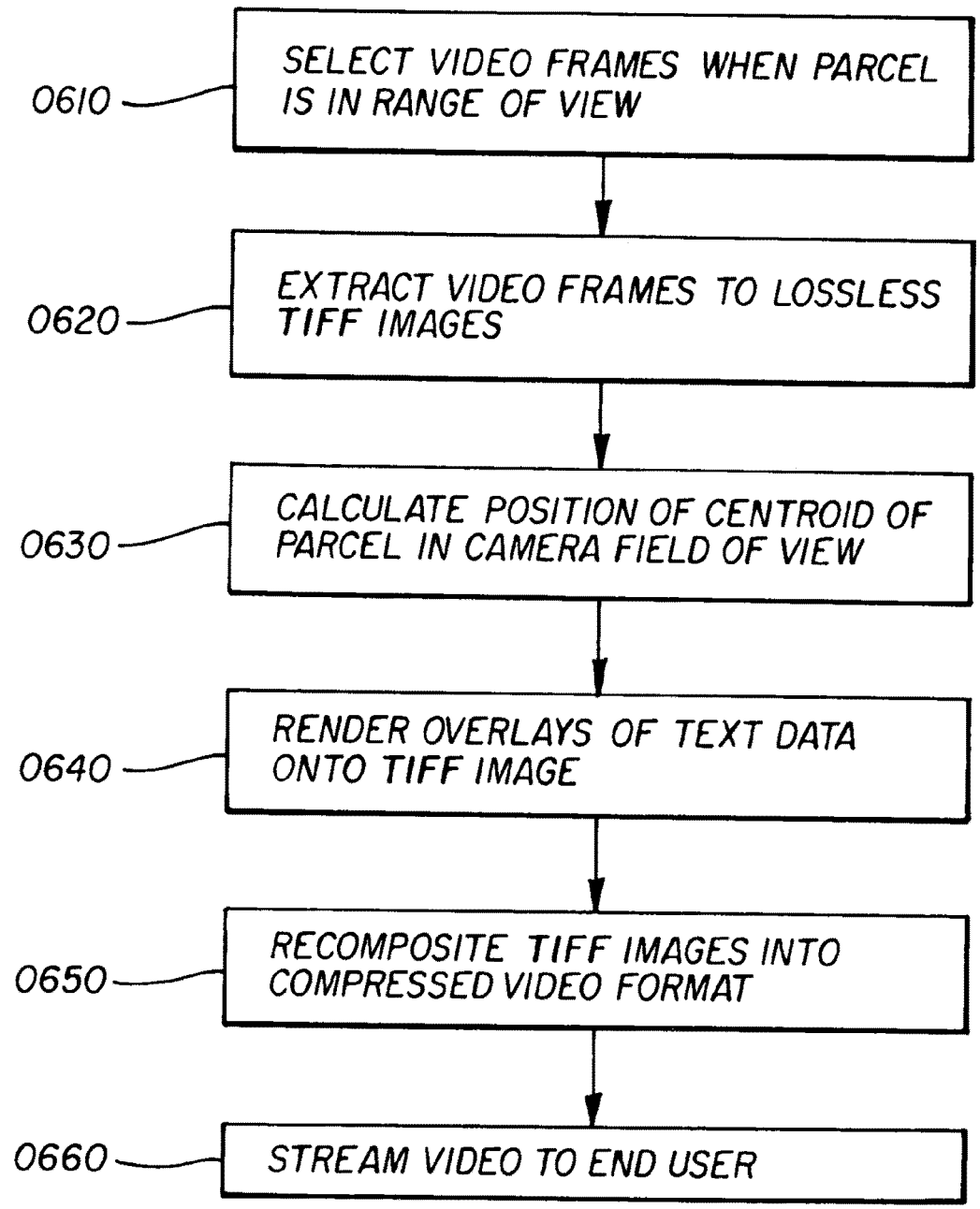
FIG. 6 is a process flow diagram for superimposing geo-coded text data over video captured by the Video Capture System of the type illustrated in FIG. 2.

FIG. 6 is a process flow diagram of the processes implemented with the image processing servers 0115 required to superimpose geo-coded text data over video captured by the Video Capture System. For a given parcel or street address, a video program 0610 determines available video segments that contain images where the property is in view. This is determined by using an open source programming tool GDAL which completes a range calculation from the latitude and longitude positions encoded in the video segments to the latitude and longitude positions of the subject property. The determination of if a parcel is in view is based on a variable distance that is initially set at approximately 300 feet from camera position to the nearest line segment of a parcel. Once a segment of video is selected that contains video frames within 300 feet, an extractor program 0620 (which is based on an open source programming tool MENCODER) converts the compressed MPEG2 data into lossless TIFF image files with each image frame file encoded for camera orientation and interpolated location.

For the target parcel, a calculation using GDAL is made in a camera centroid position program 0630 to determine the exact latitude and longitude of a centroid of the parcel, which generally approximates the location of the structure. Given the centroid of the parcel, another simple geometry calculation is made as to the orientation and location of the camera view that is pointed toward the centroid of the parcel. The location of the centroid of the parcel and the distance to the parcel is then calculated for the frame. A render program 0640, which runs on the image processing servers 0115, is then provided (in this example implemented using open source programming tool suite OpenGL and GraphicsMagick) to calculate a location within the TIFF image file in which text or an icon can be placed based on the centroid. This process is then repeated in each of the TIFF images which are then stored in each of the image files. A recompositing program 0650 (in this example implemented using an open source programming tool FFMPEG) then assembles each of the TIFF images together in time sequence to create a compressed video file. Finally, the video in MPEG2 format with the newly added text and icons added is streamed 0660 out to an end user using an open source Apache web server.

Figure 7:
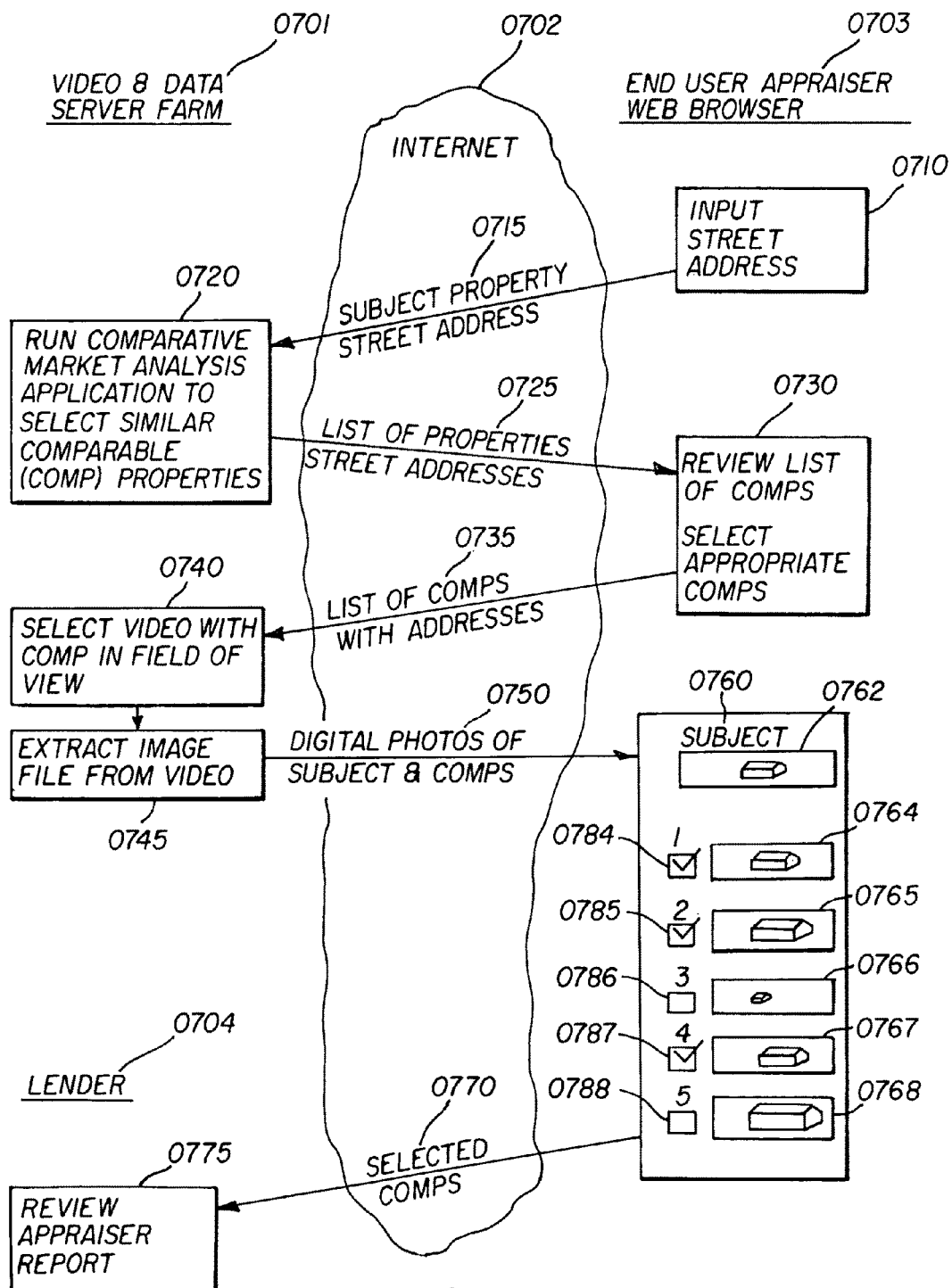
FIG. 7 is a data flow diagram that illustrates the process by which an instant drive-by appraisal or Photo AVM (Automated Valuation Model) can be created using a Video drive-by database that contains geo-coded video.

As stated above, one potential application for the above-described system is in the field of real estate appraisal. FIG. 7 is a data flow diagram that illustrates the process by which an instant drive-by appraisal or photo AVM (Automated Valuation Model) can be created using a video drive-by database that contains geo-coded video. The diagram represents four discrete locations in three columns: the upper left column represents a Video & Data Server Farm 0701; the center column represents the Internet 0702; the right column represents an end user appraiser 0703; and the lower left column represents a lender 0704. In operation, data is transferred from end user appraiser 0703 to and from the Video & Data Server Farm 0701 and finally to the Lender 0704 via the Internet 0702.

The process starts, for example, with the end user appraiser 0703 enters a street address 0710 for a subject property on a web form. The street address data is then sent 0715 to the server hosting one of many commercially available AVM or Comparative Market Analysis Applications (CMAA) 0720, which does a database search and selects a list of properties that are similar in price, size and nearby location to the subject property. The list of comparables or comps is sent 0725 back to the end user appraiser 0703 who reviews and analyses various data fields for the comps (such as price, sale date, bedrooms, square feet, structure, lot size, etc.) from the full list of comps 0730. The selected list of comps 0735 is sent back to the Video & Data Server Farm 0701 where a select video program 0740 transfers video files from the image processing servers 0115 to a video-to-digital photo extractor program 0745 (implemented in the current example using open source programming tools MENCODER and DNoise3D). Digital photos of the subject property and selected comps are then sent 0750 to the end user appraiser 0703, who is presented with a web form 0760 which contains a photo of the subject property 0762 and a set of photos of comps (0764 thru 0768).

In the above illustrated example, the end user appraiser 0703 reviews the picture of the first comp 0764 and sees that it is approximately the same size and appearance and then clicks on the first check box 0784 to accept it as relevant and appropriate. In the case of the third comp 0766 that is presented, it is too small and it is not selected 0786. The second 0765 and fourth comps 0767 are selected 0785, 0787 and finally the fifth comp 0768 is not selected 0788 as being too large and not of appropriate visual quality as the subject. The selection list is then sent back 0770 to the lender 0704 as the appraisal selected relevant comp properties report, which is then reviewed 0775 by the lending officer to assist in their financial decision process.

Figure 8:
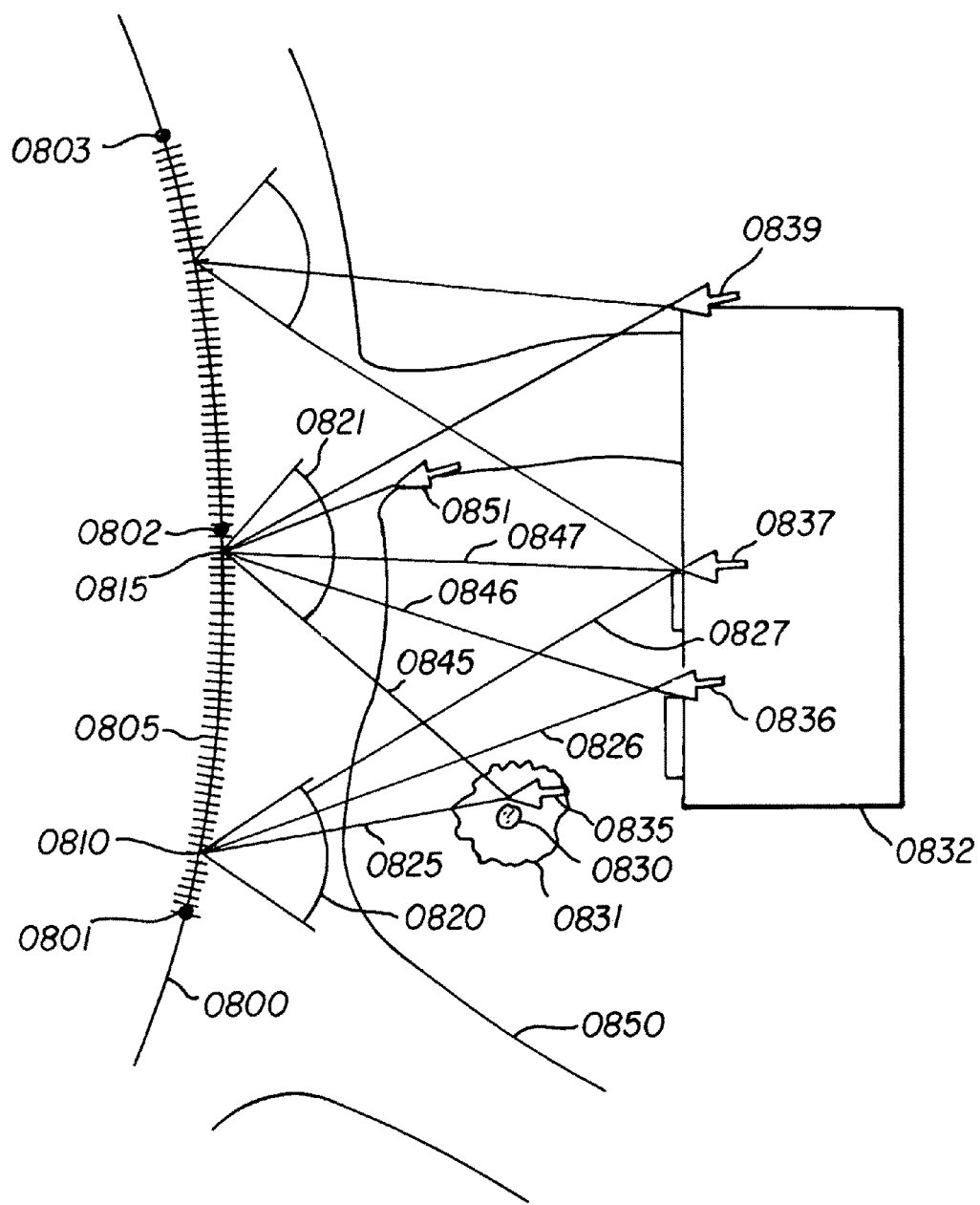
FIG. 8 illustrates a top perspective of a Video Capture System as it drives past a structure.

FIG. 8 illustrates a top view perspective of a video capture system in accordance with a further embodiment of the invention as it drives past a structure. The line 0800 represents the track of the Video Capture System with one-second GPS time stamp intervals 0801, 0802. Along the path from 0801 and 0805 there are 30 notch marks with one represented as 0805; each notch mark represents 1 of 30 video frames captured each second by a right facing video camera of the camera array. At frame 5 0810, the right camera field of view 0820 has several easily identified high contrast landmarks in sight. The term "landmark" represents any fixed object, coloration or structure that is easily identified in a digital image photograph, this can include (but is not limited to) light pole, mail box, edge of driveway, corner of building, roofline, front door, tree, bush, pond edge, awning, centerline on road, public sign, etc. The landmarks are identified and labeled in the video frames with commercially available and open source programs that provide edge detection analysis of digital image photos. The view of the left edge of a landmark tree trunk 0830 and its leaf-shading boundary 0831 is highlighted with an arrow 0835. The horizontal position of the tree within the field of view is indicated in line 0825. In addition, the camera has several other landmarks a window frame 0836 and a door 0837 that have virtual lines 0826, 0827 drawn from the camera to the landmark. These virtual lines provide a point reference in the horizontal dimension with a video frame as to the angle by which this landmark is oriented from the camera. As the Video Camera system travels along the road to another point in Frame 29 0815, which is one frame short of the second GPS time stamp 0802, a second set of landmark views virtual lines 0845, 0846 and 0848 within the right camera field of view 0821 are available for simple geometry calculations. The horizontal location of the tree trunk landmark 0835 is now in the extreme right most position of the video frame of 0815 camera position.

Using simple interpolation techniques, the position of each frame between the GPS one-second interval points can be calculated with time and speed between each. The assumptions are that no radical changes in speed or direction occur within the one second interval. Using simple geometry the change of horizontal location of the camera from frame position 5 0810 to frame position 29 0815 pointing to a fixed point 0835 enables a calculation of the distance to 0835. By combining the positions of the landmarks with the GPS data, a precise set of relative positions can be calculated for landmarks in the video. The newly created two dimensional data for the location of the landmarks can now be added to a GIS viewing software application such as the open source University of Minnesota MapSever.

Figure 9:
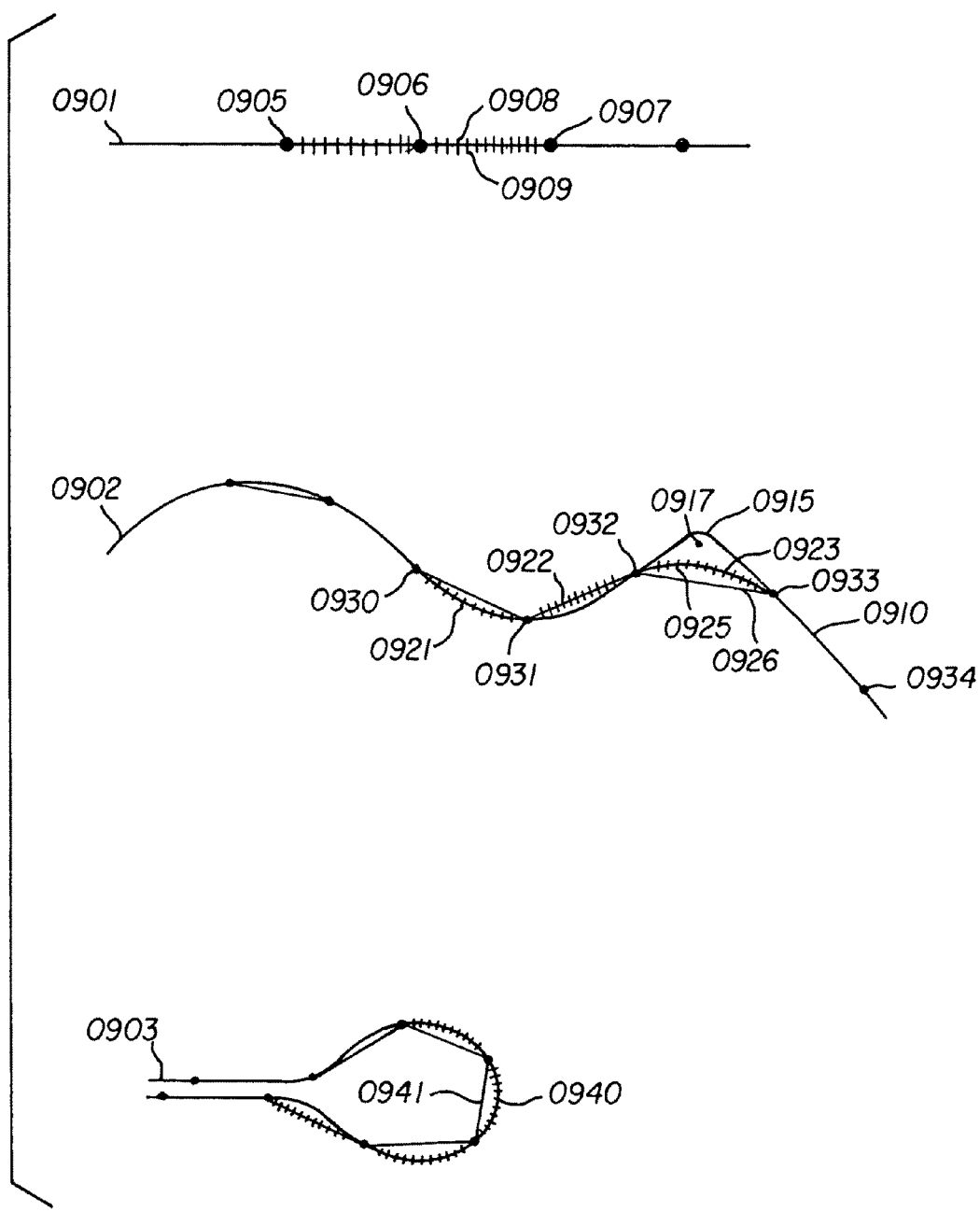
FIG. 9 illustrates a frame position interpolation in accordance with the present invention.

FIG. 9 illustrates a process of frame position interpolation in accordance with the invention. In the illustrated example, three line segments are drawn showing three scenarios of road travel to illustrate where large changes in velocity and direction within one second intervals can cause major errors in calculations of Video Capture System 0201 camera positions, if one is relying upon straight line travel from point to point. In a straight line travel 0901 three one second GPS points 0905, 0906 and 0907 are logged. A set of ten notch marks representing every third video frame are illustrated as 0908 and 0909 which are frames 4 and 7 respectively. In this case the actual camera position is nearly identical to the calculated camera position.

The second line segment 0902 illustrates the difference between actual travel 0915 of the Video Capture System on a windy road with a stop sign 0917 versus the calculated position of travel 0925 and 0925 versus the point to point travel 0926. The calculated position of travel is based upon using a fourth order polynomial function with parameters that the coordinates of four data points 0930, 0931, 0932 and 0933. This function calculates line segments illustrated as 0921, 0922, 0923 which have notch marks. In the case of the first line segment 0921, it is drawn over the actual path illustrating a highly accurate estimation of the travel path. In the second line segment 0921, a nearly straight line 0922 is calculated versus the actual turn. In the worst case scenario of line segment three 0925 there is a large deviation from the actual path 0915 as a driver made a right turn at a stop sign (without stopping) within the one second interval. The calculation of 0925 is closer to the actual 0915 than the linear point to point 0926 line segment.

The third line segment 0903 illustrates the calculated path 0940 of a Video Capture System as it navigates a cul-de-sac with is highly accurate in motion to the actual path versus the point to point path 0941. A spline polynomial method works well in that it creates smooth curves that fit the natural motion of drivers as they make constant G force turns with smooth turns on a steering wheel.

Figure 10:
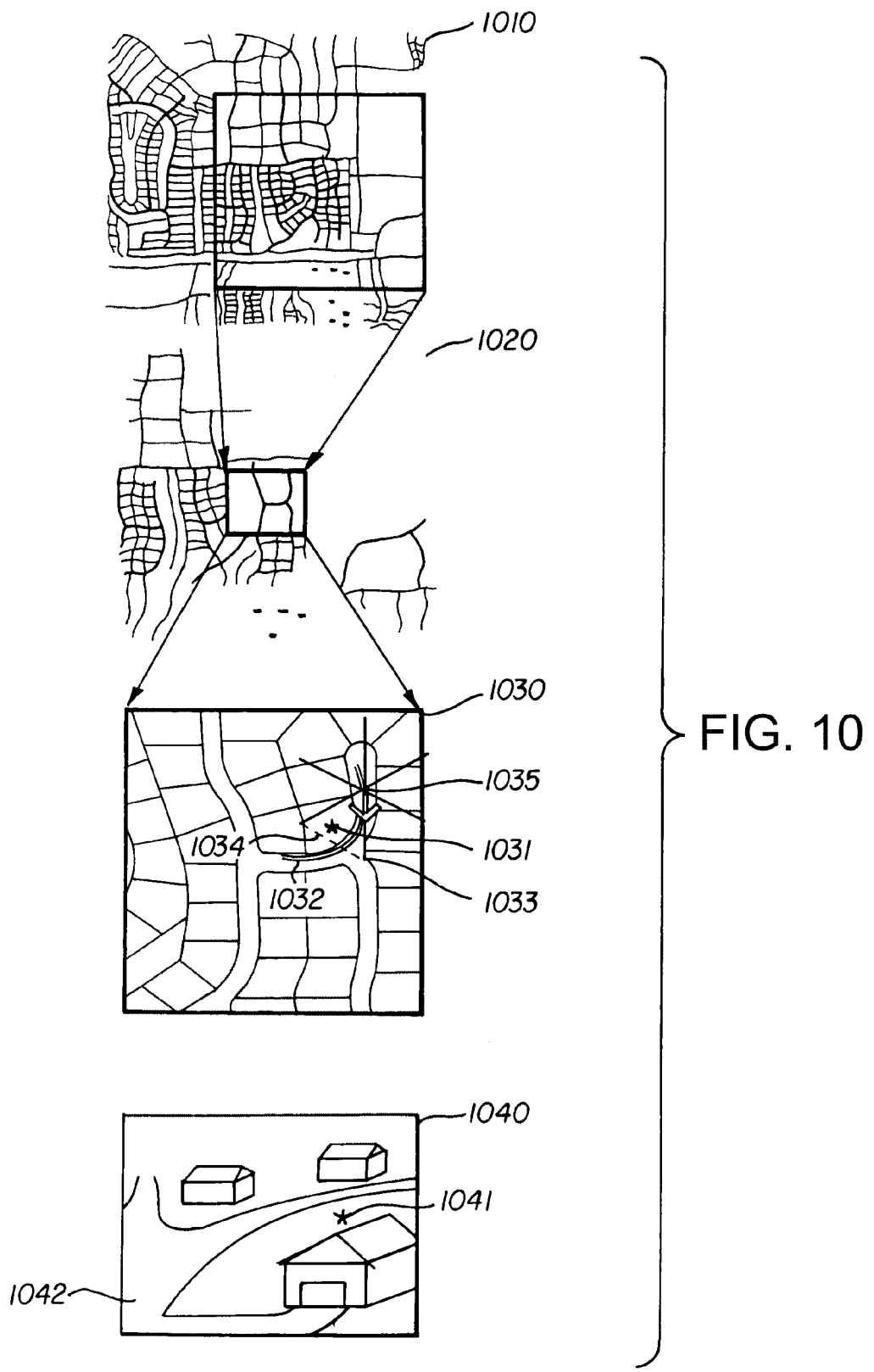
FIG. 10 shows a set of four illustrations which represent a single frame or portion of a window within an Internet Web Page in accordance with the invention.

FIG. 10 illustrates an aerial transition to street process. A set of four illustrations 1010, 1020, 1030 and 1040 are provided, which represent a single frame or portion of a window within an Internet web page. The top three illustrations 1010, 1020 and 1030 are created using an open source GIS Mapping program, such as University of Minnesota Map Server, to show parcel line boundaries. The three sequential illustrations show the effect as a user is zooming twice from 1010 to 1020 and then 1020 to 1030. Once the user has reached a designated zoom height as in the case of web page view 1030 where individual parcels can be clearly seen, addition image layers 1031, 1032 and 1033 are added. The centroid 1031 of a selected parcel is identified with the motion of travel 1032 of the video segment as the starting point of Video Capture System camera position, and direction of travel 0133 with the dashed line 0134 representing the field of view of the camera. Finally, the fourth web page frame 1040 in the sequence illustrates the smooth transition from aerial to street view of a selected parcel. In this case a single frame is shown based on the position 1035 of the Video Capture System. The centroid of the parcel of web page frame 1030 is illustrated as 1031 and in the fourth web page frame 1040 the same parcel centroid is now illustrated as 1041 providing the end user good visual cues to help them see where they are as they view a street level image. The actual path of the Video Capture System is drawn on the video frames as 1042 as the drives past the designated parcel.

Figure 11:
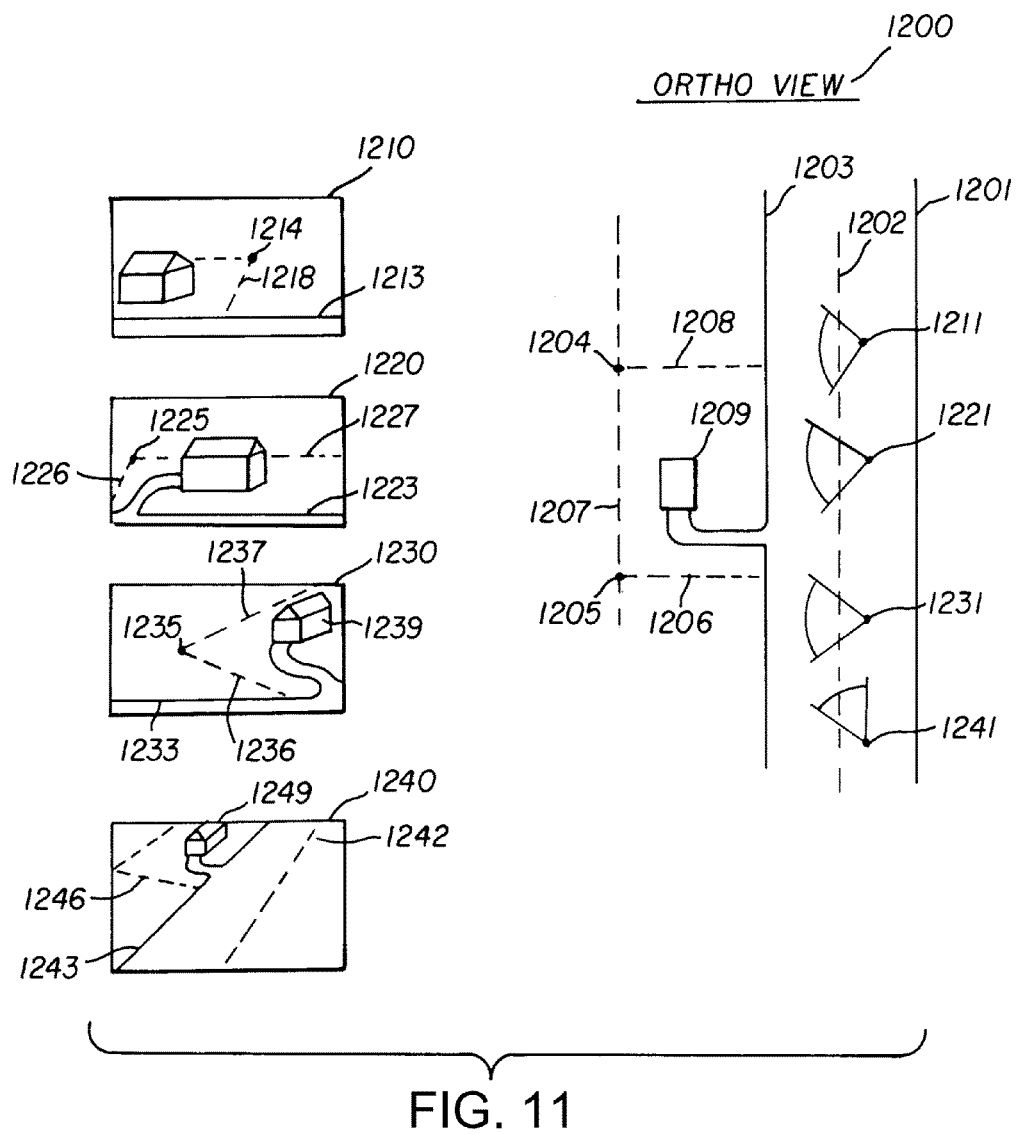
FIG. 11 illustrates a process by which images captured by a left facing and a left front facing camera in a Video Capture System can calculate and generate superimposed property.

FIG. 11 illustrates a process utilizing real property vectors in accordance with the invention, by which images captured by a left facing and a left front facing camera in a Video Capture System can calculate and generate superimposed property lines on both video and exported digital image photos from the video drive-by data. In this illustration, an ortho view 1200 of the travel of a Video Capture System along a road is shown with four discrete image frame capture points 1211, 1221, 1231 and 1241. These image frame capture points are illustrated on the left hand side as 1210, 1220, 1230 and 1240. In the case of camera position 1241 where the car is approaching the subject property 1249 and 1209 the camera has a view of the left side of the road 1203 and 1243 where the property line 1246, 1206 and 1226 can be calculated as described above and shown on a digital image photo. The second 1230, third 1220 and fourth 1210 digital image photos show the changing perspectives of the Video Capture System camera as it moves past a subject property.

Figure 12:
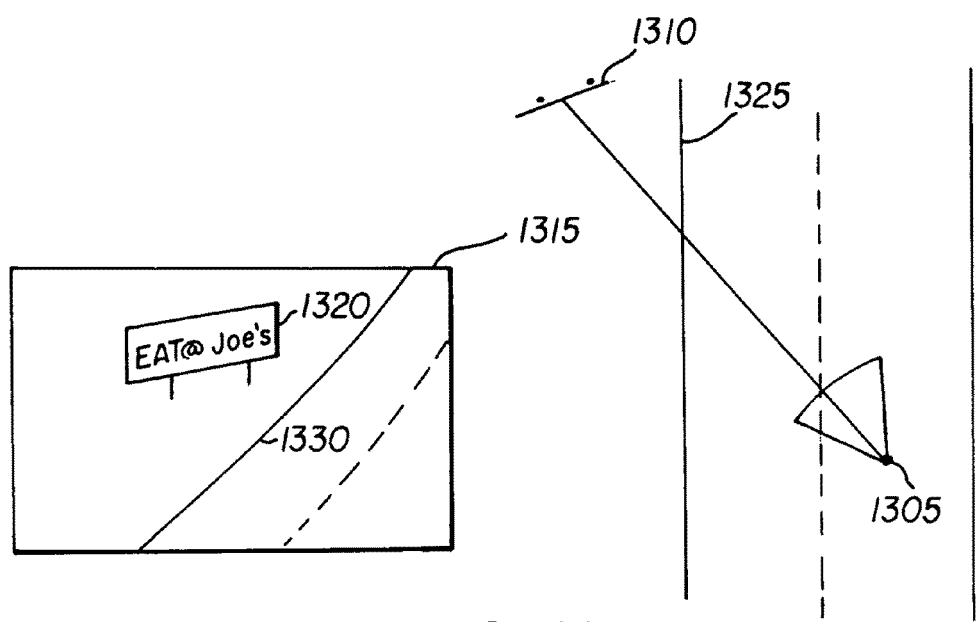
FIG. 12 illustrates a process to extract and create a point of interest database that is encoded with GPS data.

FIG. 12 illustrates a process to extract and create a point of interest database that is encoded with GPS data in accordance with the invention. Using the Video and Data Server Farm Image processing cluster of servers 0115 and the video frame to digital image photo extraction process 0620, any one of several dozen OCR programs can be run on the extracted digital image photos to build a results file of recognized text. In this case, a Video Capture System's front left camera at position 1305 is viewing a sign 1310 and 1320 that contains recognizable text. This text data is then written into a database that includes but is not limited to: the text characters, size and color of the text, relative position of the characters in the field of view and GPS coordinates of the video frame. Exact position in latitude and longitude of the text of the sign can be located as well as the relative orientation.

FIG. 13 illustrates two ortho views 1400 and 1450 of a Video Capture System as it drives in a direction of travel 1410 along a path 1415 past a selected parcel where one of six possible cameras may be viewing a subject property. The hexagonal array 1405 indicates the range of view for each of the six cameras. The Video Capture System at position 1401 has a subject property centroid 1420 in the field of view 1425 of the right front camera. The field of view can be easily calculated by drawing a virtual line segment 1445 from the camera position 1401 to the centroid 1420. As the vehicle moves along the path 1465 in the second ortho view 1450 the right camera field of view 1475 is now containing the centroid 1470 of the subject property when the camera is in position 1451, which is illustrated by the virtual line segment 1460.

Figure 14:
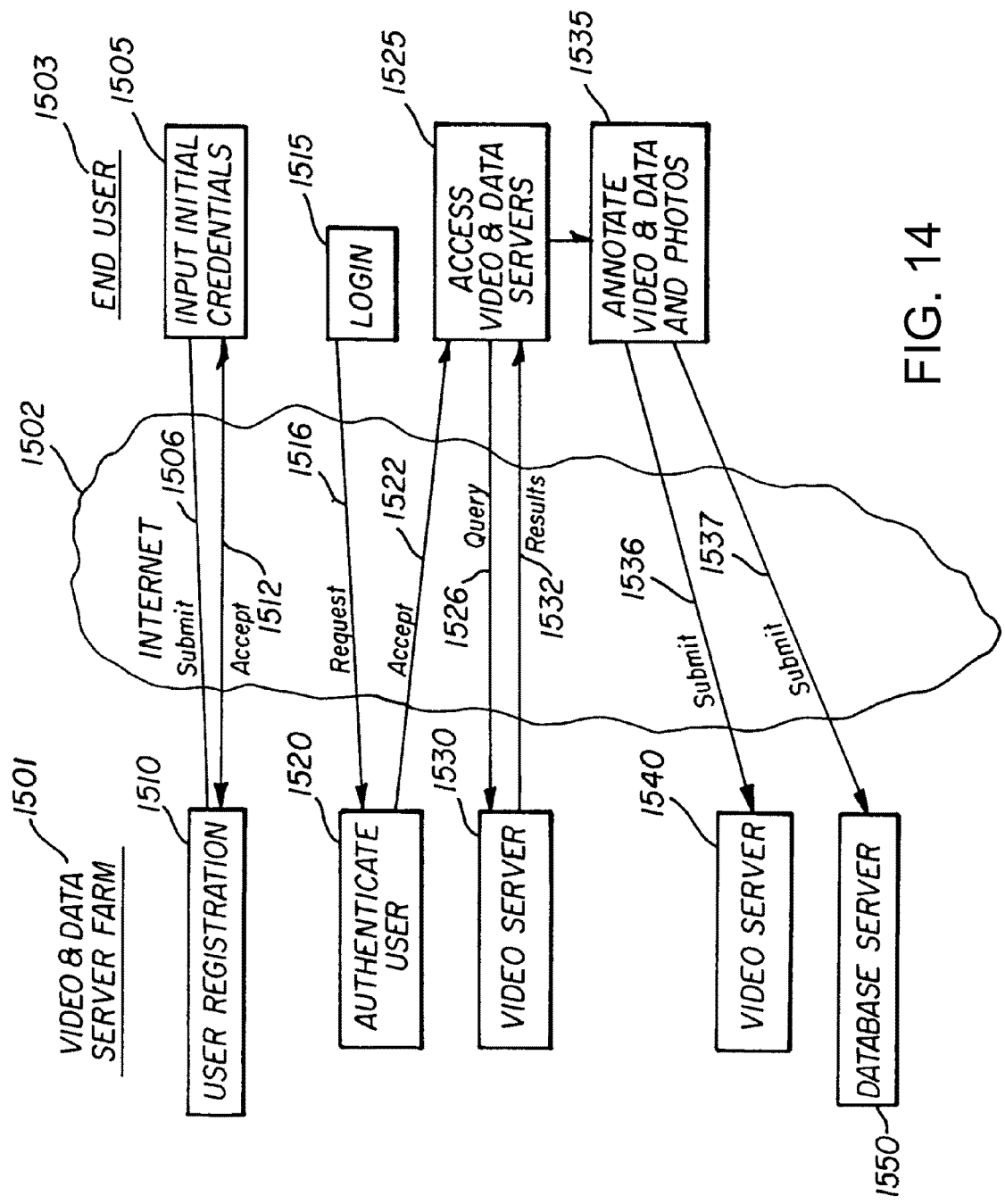
FIG. 14 illustrates a process by which an authenticated end user can submit data regarding a specific location using Video drive-by data as a geo-coding reference tool.

FIG. 14 illustrates a process by which an authenticated end user 1503 can submit data regarding a specific location using video drive-by data as geo-coding reference tool. The figure has three columns: the left column represents a Video and Data Server Farm 1501; the middle column represents the Internet 1502; and on the right column represents an end user 1503. The process starts when the end user 1503 establishes credentials 1505 to authenticate with personal information such as their name, address and email with a credit card number, social security number, date of birth, drivers license number, etc. At that point they can select their login and password and submit 1506 to a common and commercially available registration application 1510 running on an Apache web server. Once a new user is established 1512, the user can then login 1515 and send a request to authenticate 1516. When that user is authenticated 1522, they are now granted access 1525 to the video server 1530 where the can do a series of queries 1526 (by street address or clicking on a map as shown in FIG. 5 or 7) where they obtain results 1532 in the form of video feeds.

When the user is ready to review and edit property data, they login and authenticate with the password. Using one of several modes of selecting a property, they view a particular parcel or area with a picture of the property. The viewer application can show video with various information such as parcel data or property lines illustrated on the property. The user can also select the video to present frames at a slower rate than 30 frames per second to allow careful viewing of the imagery. At that point, where the end user sees a property, they can annotate any landmark by clicking on the image of a property (such as the roofline of a house 0545 shown in FIG. 5). They can use the cursor to establish a point on an image as a designated landmark. The user can then tag the same landmark in one or more video frames to further clearly tag the image designated landmark. By processing the relative location of the image in the video frames as the vehicle moves, the exact latitude and longitude coordinates can be determined (with an estimated error calculation included in the data). When the user has selected the point within the image, that location data of the one or mouse clicks with a (point, line segment or shading of area or attachment of an icon) can be submitted 1536 to the video server 1540 and submitted 1537 to the database server 1550 for permanent storage and retrieval by another user. The database includes individual record entries of each and every annotated data set to generate a detailed change log. This log file can include but it is not limited to latitude and longitude of camera position, estimated accuracy of camera position at time of capture, time of original video capture as well as end user annotation time.

Figure 15:
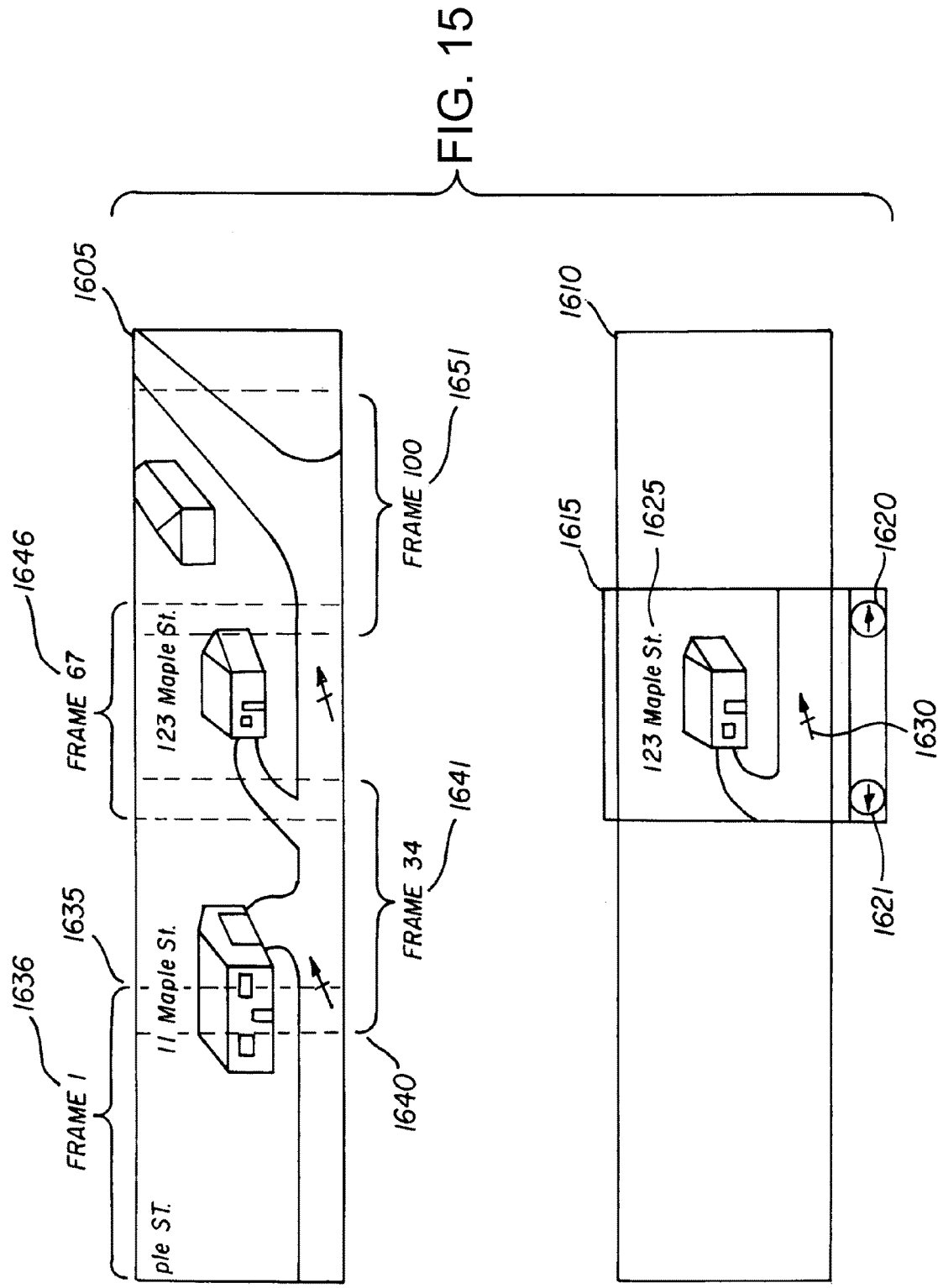
FIG. 15 illustrates a process and visual references as to the calculations required to extract a photograph from a street number in accordance with the invention.

FIG. 15 illustrates a process and visual references as to the calculations required to extract a photograph from a street number. The process starts with the loading of county parcel data that typically includes latitude and longitude coordinates of vector line segments that identify the individual parcel lines of given property. Typical county parcel records include street name and number as part of the parcel number that is supplied as a separate database with the parcel number itself being the unique ID that is used to link street address to latitude and longitude encoded parcel lines. This figure includes two diagrams 1605 and 1610. The top diagram 1605 shows a horizontally stitched together set of frames of video 1636 and 1641 as the left Camera is moving by a set of houses. The stitching process can be accomplished by using any one of several dozen commercially available programs running on the video image server cluster 0115 after the video frames have been extracted as indicated in FIG. 6. The stitching program will be feed a set of digital image photos in this example Frame 1 1636 Frame 34 1641, Frame 67 1646 and Frame 100 1651 are used to composite a complete wide horizontal view of the street. Each second of video produces thirty individual image frames. Accordingly, in this example, 3.3 seconds of video were used from frame 1 to frame 100. The frame number to use when driving by properties is easily calculated by the speed data from the change in position of the GPS data points. Using techniques described above, text can be superimposed 1625 onto the digital image photo.

As illustrated in diagram 1610, an end user is using a web page viewer 1615 to move a set of left 1621 and right 1620 control arrow button to select the image that evenly frames a subject property in the field of view. By providing a long horizontal picture view 1605 in a square computer monitor viewer web page 1615 an end user can easily identify properties with large street numbers 1625 displayed as they are looking to identify a property.

Figure 16:
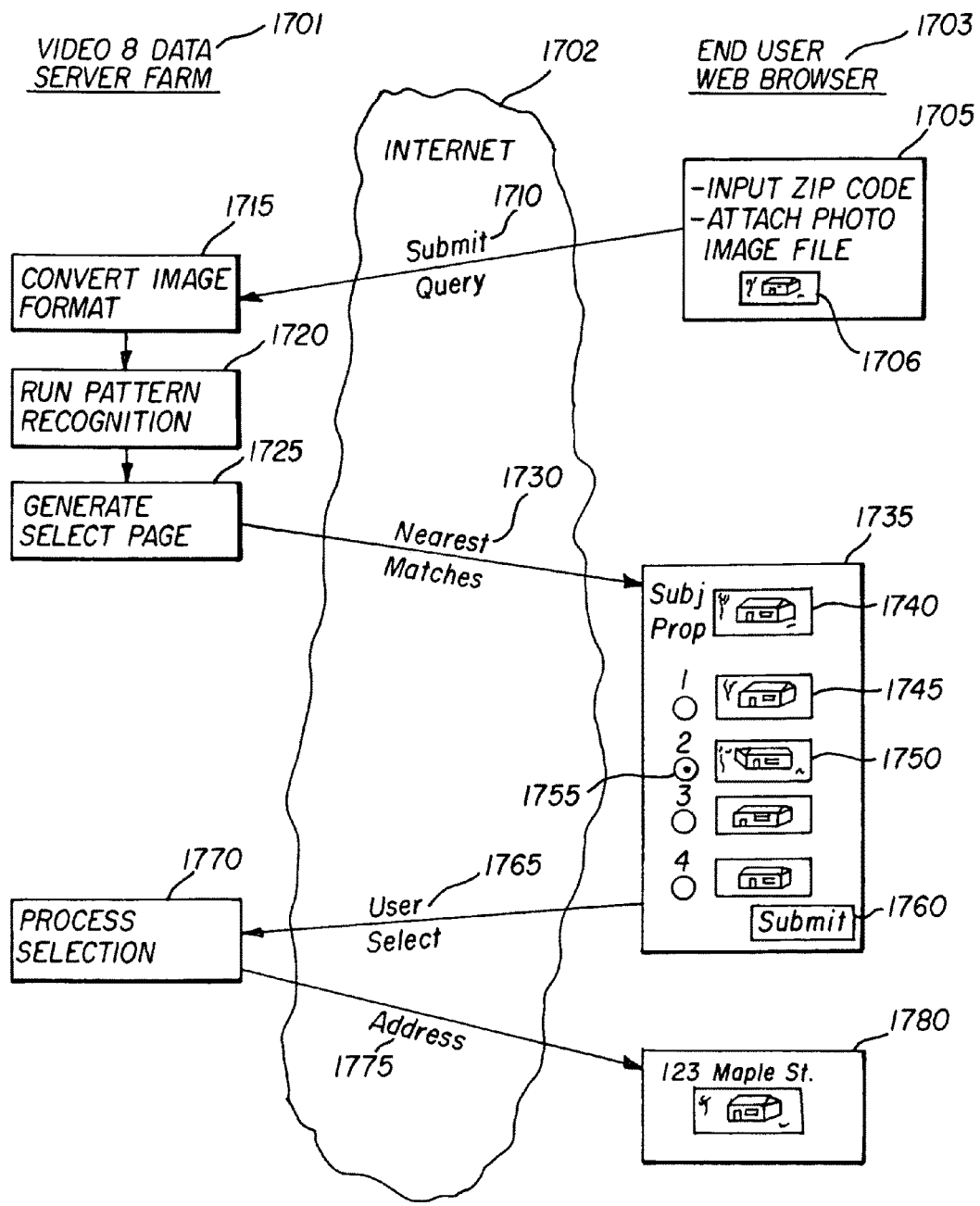
FIG. 16 illustrates a novel method of finding a house from a photograph based on the invention.

FIG. 16 illustrates a novel method of finding a house from a photograph based on the invention. FIG. 16 includes three columns: left column 1701 represents a Video and Data Server Farm, the middle column represents the Internet 1703; and the right column represents an end user. The process starts with a user entering a web page 1705 where they can upload a digital image photograph 1706 of a property taken from the street. The user can also input a zip code where they think the property is located to enable faster searching. Once they have entered the zip and attached the photograph, they can submit 1710 the data to the server. At the Video and Data Server Farm the uploaded image is converted 1715 to the appropriate standard format of uncompressed bits representing each pixel. The uncompressed image is then processed with one of several commercially available pattern recognition applications 1725, where the uploaded image 1706 is compared to the street level digital image photographs extracted (for example those illustrated in FIGS. 13 and 15) from the video drive-by process. The photos that have patterns matching the closest to the submitted 1706 photo are then extracted and added to a webserver to create a web page 1725. This web page is then delivered to the end user as a web page 1735 with the originally selected photo 1706 redisplayed as 1740 with additional extracted images 1745, 1750 below. The end user does the final human based pattern matching by selecting with a radio dialog 1755 the image that looks the closest and then presses the submit button 1760. This data selection is sent to the server 1765 where the server processes the selection 1770 to generate a web page that returns 1775 the street address and picture of the property 1780.

Figure 17:
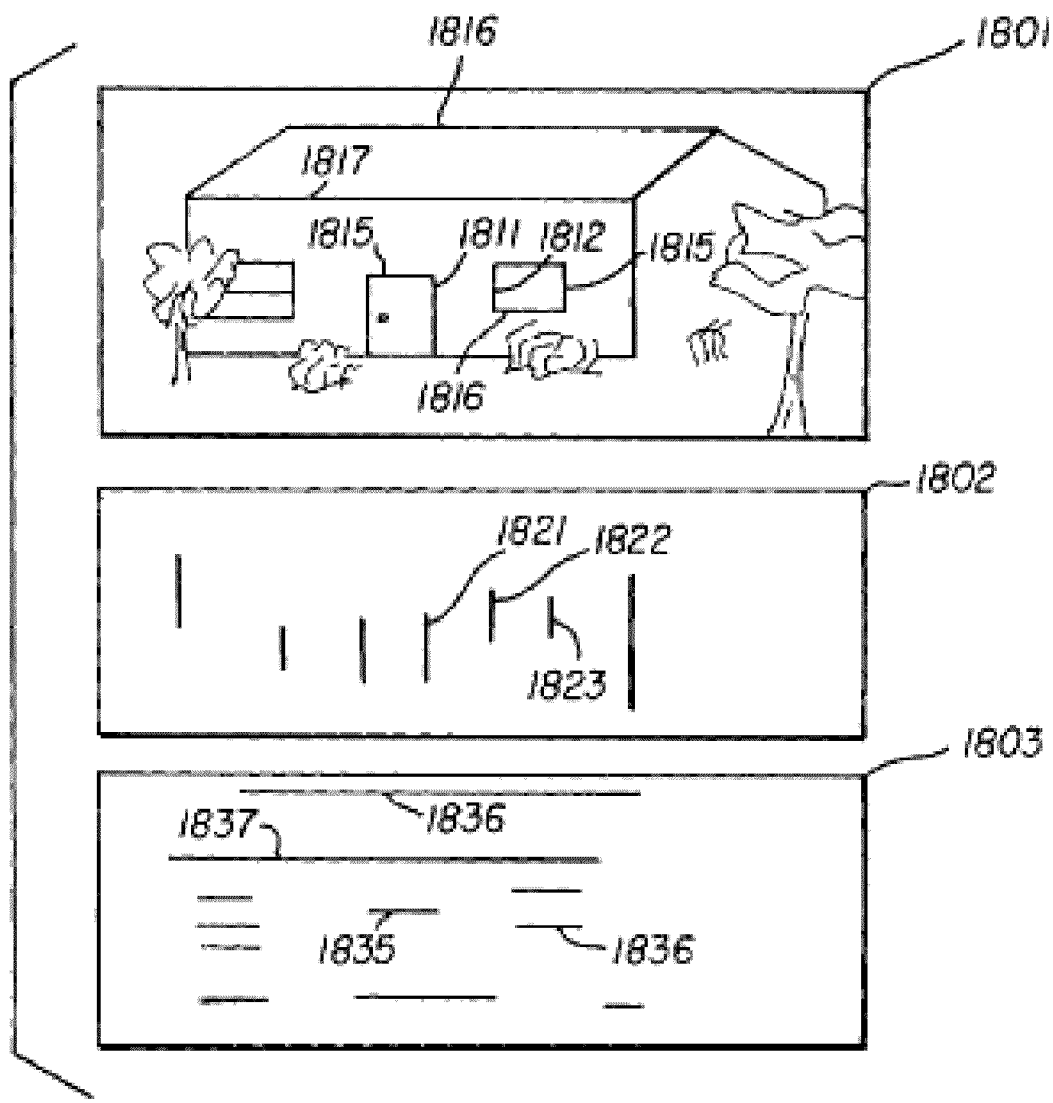
FIG. 17 illustrates one novel method of identifying a home from a large library of home photos with a high speed process in accordance with the invention.

FIG. 17 illustrates one novel method of identifying a home from a large library of home photos with a high speed process. The process involves using one of many commercially available applications that generate edge detection patterns in an image. In this figure, an image of a house 1801 is shown with various lines that would be trivial for an edge detection algorithm to find properly. In order to process the data most efficiently, only horizontal and vertical edges would be selected. In this figure, horizontal lines such as the top of the front door 1815, top of the roof 1816, and roof line 1817 and vertical lines such as front door 1811, left edge of the right window 1812 and right edge of the right window 1813 are easily identified. In the second diagram 1802 the vertical edges are displayed as a set of bar codes that have a relative horizontal distance from each other. The bar line 1821 is derived from the right side of the front door 1811 and the left side of the right window creates another bar line 1822. In the third diagram 1803, the horizontal edges that have been detected are displayed as bar lines. In this diagram bar line 1836 is detected on the top of roof line 1816, and bar line 1837 is the roof line 1817, and the bar line 1835 is the top of the door 1815 and finally, the bar line 1836 is the bottom of the right window sill 1816. The storage of the discrete bar lines as mathematical values with relative position data enables a numeric pattern match of values between photos taken at different distances from a subject property. In this way a set of numbers representing the largest bar lines as vectors can be stored and compared against a large numbers of properties with a simple sorting process.

The present invention may be applied to many applications in which the remote ability to view a specific location and its surrounding neighborhood is advantageous. For example, land owners, prospective land owners, insurance, mortgage, county appraisers need accurately to determine where property lines are located in relation to a property. Today, a physical visit to a property with a survey in hand is required to start the process of determining where the property lines are located. In fact, many times a professional surveyor may be required to find the original iron stakes that are usually covered over with vegetation. Once the stakes are found, using long tape measures and surveying equipment, an accurate determination can be made of the locations of various structures and landmarks in relation to the property lines. In contrast, the present invention permits the merger of a unique set of data together to generate street level digital image photographs of properties that include superimposed illustrations of property lines based on original latitude and longitude data provided by the county property appraiser's office. This highly convenient method of illustrating survey data fits a wide variety of unmet market needs.

As another example, occasions exist where people as they drive past properties want to find out who owns the property and what they paid for it. The present invention enables an end user the ability to select any street via an on-line web page and scroll along a view of images where the county parcel data is superimposed in the video stream. Images of property parcels as well as the camera orientation pointed toward the centroid of the parcel are provided along with property record data that can be processed to locate the centroid of the property and then display text data of sale price, owners name & street address above the image of the house.

Further, property appraisers are mandated by many state and local governments to obtain photographs of properties that they tax. Currently some counties pay $10 to $50 to have a driver go to specific properties, take a digital image photo and email it to the appraiser. Also, some counties contract to have firms drive along streets shooting photos and storing them in a database that they deliver to the appraiser for a fee of $1 to $2 per parcel. In contrast, with the present invention, a county government could contract to view video of parcels in a far more economical manner by using our Video Capture System driven by their existing appraisal staff. The data they capture can then be added to the Video & Data Server Farm and is available for viewing in a 360° view not just in a single view of a property. From the video, dozens of individual photos are available for the property appraiser to view at any time and by default the centroid oriented view at a 90 degree angle can be shown first.

Still further, emergency service agencies have equipped their vehicles with high speed wireless data networks to augment their voice radio network. The wireless data networks enable access to the Internet and the Virtual Private Network to provide information related to the location and details on the emergency call while in route. This location data is typically a street address and a map with directions. Maps today generally do not have good positional accuracy for individual street addresses. So when emergency responders pull onto the street, they immediately commence looking for house numbers. When these numbers cannot be found especially at night, they resort to guessing and this consumes valuable time when seconds count. A solution which has been implemented in several counties is to provide a database of street photos that are tied to parcel data. This process is done by manually photographing properties and linking them to a database of street addresses that may or may not be encoded with latitude and longitude data from a GPS. The present invention enables the automatic and low-cost capture of street level video which can be encoded with parcel data and GPS coordinates so that the Video & Data Server Farm can generate a long horizontal street level image that can be transmitted rapidly as a single image to an emergency vehicle in route which aids in the ability for the emergency responder to quickly decide at which house to stop.

Today, on-line map users are presented with a top view of a set of streets that are annotated with color highlighting and indicators such as red stars that make it easy to identify where they need to go. The present invention includes the additional opportunity to present street level images of turns and intersections that enable users to "see" what an intersection looks like a few hundred feet before they arrive and need to turn. With the present invention, the user could see that there is street level video available based on showing a double red line for example that the user could click on to see a street level image. When the user clicks on the red line, they would immediately be presented with video from that exact latitude and longitude coordinate.

Today, home buyers turn their heads as they drive by properties that have for sale signs in the yard. Although there is no system on the market today for viewing street level video on-line, there is a need for the camera view to be oriented at a property as the 360 video capture system moves past the property. With the present invention, the Video & Data Server Farm has the latitude and longitude coordinate data of the camera as it drives by and in addition, and it has the latitude and longitude coordinate data of the centroid of the parcel that is for sale. Given this data it is easy to determine which camera position is actually pointed at and has in its field of view the centroid of the parcel. Typically homes are located with the foundation over the centroid and thus the automatic camera orientation method provided by the present invention will enable the automatic selection of the correct camera view to present to the user when they are "driving online".

Today as appraisers and real estate sales people insurers, construction, repair, maintenance people are interested in specifying a location or a landmark for a property, there is no facility available on line whereby a user could login annotate an image and then store that for viewing by others. With the present invention, a user could access a video and/or a set of image files that include GPS coordinate data, camera orientation and optionally property line and parcel data superimposed over the image. With this image available, the invention provides a simple on-line viewing application that enables a user with his mouse to click on the image presented and then open a text/dialog box where they can add comments to the designated landmark within the photo. Given an authentication process where the comments made by the individuals can be stored within the database, a permanent log can be made and viewed by others relating to the property with accurate representation as to who made the comment.

Today, when photographers visit a property to take a street level photograph, they naturally take care as to locate the camera along the street and orient the camera within a few degrees left and right as to the field of view so the picture "looks good" and the house is "well centered". The present system allows the automation of finding a reasonably good view of a property, by utilizing the centroid image view automation process with an end user based process of "fine tuning" a view of a property. With the user viewing a stitched image of the subject and its next door neighbors, they can slide the bar right and left to simulate their movement of a photographer on the street moving right and left to get the image "just right". Once that user selects their favorite frame, the system will store this optimal view coordinate data and also generate a full resolution digital image photo file for delivery to the user.

Today when people view a photograph of a home that they are interested in buying on-line on a public website, they are not given the address of the property. Typically they are only provided with a photograph and the zip code of the property. In this regard a user is constrained from determining if the property is in a neighborhood they like or is near a particular set of amenities such as school, or church. For a buyer to locate the house, they would need to invest time to contact either the listing agent or they would need to agree to be represented by an agent to access the street address information. With the present invention, one could have an image of this home in the Video and Data Server Farm, thereby enabling a user to submit an image of the home to the Video and Data Server Farm to process and locate. The servers would run one of several commonly available pattern matching processes against the images for a particular zip code and then present a set of properties that "look close" to the one the user submitted. Given the fact that humans are vastly superior to systems for pattern recognition, a list of 20 close matches out of 2000 potential homes in a given zip code can be easily viewed and selected by an end user in a couple of seconds. Once the user has selected the home that matches, they can then be presented with the street address and any other market comparable data they may wish to obtain.

In another embodiment, methods and apparatus are provided for presenting a three-dimensional model of a subject, such as a geographic area. The three-dimensional models can include a polygon based model format generated from a point cloud array and sprayed with actual image data of the subject, captured from disparate points along a continuum.

A user interface is presented with user interactive controls that allow a user to traverse the three-dimensional model. A user location within the model will determine which portions of the three-dimensional model are viewed. Some embodiments can include user interactive devices that allow a user to traverse the three-dimensional model in three directions: a) an essentially up and down vertical movement; b) an essentially side-to-side horizontal movement; and c) a depth movement into and out of the three-dimensional model. Image data and three-dimensional polygon based models presented to an inventor at a given instance can be dependent upon the relative position selected by the user within the user interface.

In another aspect, icons, overlays and metadata can be presented to a user upon demand to provide further information relating to a given geographic area within view.

Still another aspect can include presentation of one or more geographic areas based upon criteria ascertainable from related data. For example, image data can be correlated with geospatial data so that a particular street address or Cartesian coordinate, such as a latitude/longitude location, is designated and specific image data is presented which correlates with the geospatial data. The specific image data can be presented sprayed over three-dimensional structures generated from two-dimensional image data captured from that specific location.

In additional aspects, some embodiments can also include indications on the user interface of user selectable data related to a particular location. User selectable data can include, for example: cellular phone signal strength; wireless network data, including network name, location and signal strength; global position system satellite data and signal strength; radio signal strength; school district data, average yard size, property price range; building features; proximity to amenities; political boundaries; zoning restrictions; and almost any other measurable quantity. Data can all be correlated according to a geographic location and presented in various combinations or upon demand. In addition, the data can be presented in conjunction with or independent of, an image data continuum or image data set.

Definitions

As used herein, Video DriveBy™ refers to street level video data captured in multiple angles encompassing a 360° view.

As used herein, Video FlyBy™ refers to Aerial/Satellite oblique (angular) view images with polygon line views.

As used herein, RibbonView™ refers to a film strip like view of properties that stands up at approximately 90° from a flat or angled aerial/satellite ortho image map and provides direct-on front images of properties to be displayed.

As used herein, Flash Viewer (Streaming Video) refers to direct streaming of video to an online user via a web browser.

Methods

Figure 18:
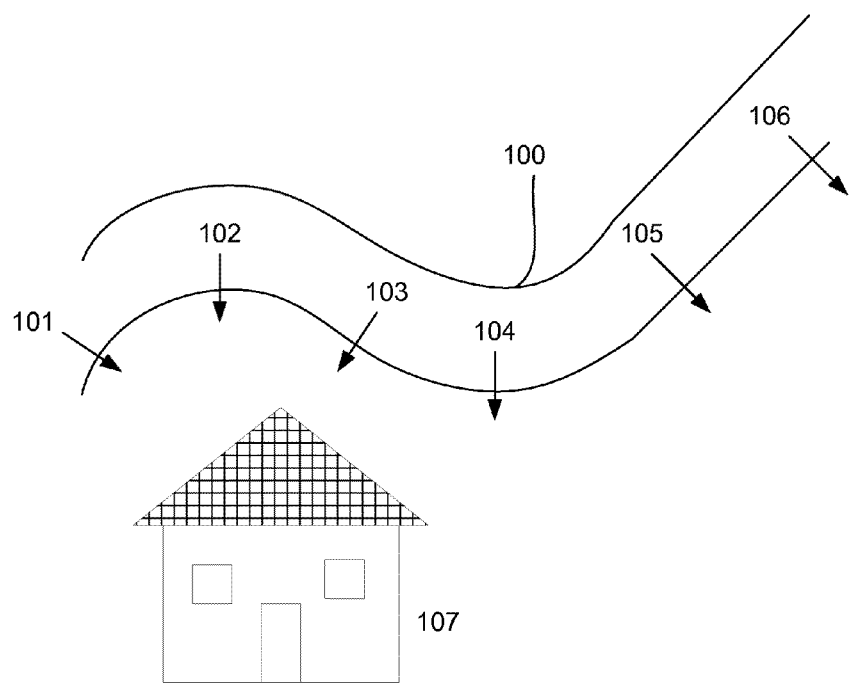
FIG. 18 illustrates a continuum from which image data sets capture a subject.

According to the present invention, image data is captured from disparate points along a continuum. Referring now to FIG. 18, in some embodiments the continuum 100 includes the path of a vehicle carrying a digital camera, or other image data capturing device. Image data sets are captured at disparate points 101-106 along the continuum. Some preferred embodiments include capturing each image data set at an angle that is generally orthogonal to the subject matter 107.

Positional data and orientation of the camera capturing image data sets is recorded for each disparate point 101-106 along the continuum from which an image data set is captured. Positional data can include any data indicative of where the subject matter of an image data set is located. Some preferred embodiments of positional data include Cartesian coordinates that are context sensitive according to the mechanism used to generate coordinate data.

Positional data can be generated, for example, by an image data recording device, such as a camera, associated with a device for recording a global position (GPS device). Time stamps associated with image data sets and time stamps associated with the GPS data can be utilized to correlate the GPS location data with image data set recorded by the image data recording device.

In still another aspect, in some embodiments, an altimeter can be used to record an altitude from which a camera records image data sets. The altitude data can be associated with an image data set, for example, metadata correlated with the image data set. Such embodiments can therefore include recordation of a latitude, longitude and altitude coordinate for a given image data set. In addition, it is also within the scope of this invention to record a time of generation of an image data set and a depth of focus for an image data set.

According to the present invention, geospatial data, such as latitude and longitude coordinates, can be generated by the GPS and stored with image data generated by the camera. In some embodiments, GPS data can be time stamped and collected once every second. However, in some instances, GPS reception can be interrupted, depending upon location relative to large object, such as multistory buildings, or cold cover. Therefore, some additional embodiments can include an accelerometer for recording motion associated with a camera and a GPS unit operatively attached to the camera.

Data from the accelerometer can indicate movement of the camera. Some accelerometers, such as micro electromechanical system (MEMs) accelerometers can easily be incorporated into a camera system assembly attached to a vehicle. Use of multiple MEM accelerometers positioned to measure movement in four or more directions along an x-axis, y-axis, and z-axis in relation to a camera can also be used to calculate direction of movement. The accelerometer can therefore be used to extrapolate a current position of the camera, based upon a last set of GPS geospatial data recorded.

Geospatial data can be used to indicate an initial geographic position. A change in geospatial data can be additionally utilized to indicate velocity and direction of image data set capture. Accelerometer data may also be used to indicate a velocity and direction of image data set capture. Accelerometer data may also be used to indicate a velocity and direction of camera movement. Calculations of time elapsed at the indicated velocity (such as for example, the Kalman Filter) can yield a calculated position at a time of image capture, even if the time of image capture is between GPS readings.

For example, one standard can include tracking a camera position with a GPS unit that records location at a rate of once per second. The camera can record image data at a faster rate than once per second, such as, for example, one of: 12 images per second, 24 images per second or 29.97 images per second. An initial camera position can be recorded that correlates with a GPS reading; subsequent image data capture will occur in between the one second GPS reading interval. The camera position can be determined with a calculation based upon the velocity of camera movement supplied by the accelerometer and time elapsed since a previous GPS reading.

Still other embodiments can utilize optical flow methodology and visual odometry to facilitate calculations of a camera position and the velocity of a vehicle or person from which a series of image data sets are captured. Visual odometry can be accomplished with a single omni-directional camera or with stereo cameras and is based upon processing that tracks the position of salient features in a series of feature sets and calculates movement based upon the relative positions of the features. In some embodiments, camera based simultaneous localization and mapping (SLAM) of visual image data can also be used to facilitate calculations of velocity of a change in position of a camera used to capture image data sets. Typically, the velocity will be directly tied to the motion of a vehicle to which the camera is mounted, or a person carrying a camera rig.

Orientation of a camera can include a direction of image capture recorded by the camera. Orientation can be designated, for example, in relation to the cardinal directions, i.e., north, south, east and west. Any means available to record such a designation, such as an electronic compass, is within the scope of the present invention. However, it may be desirable to include a means to record the orientation with a greater degree of accuracy than is typically available through the use of an electronic compass.

Therefore, in some embodiments, orientation can be determined according to a fixed position of a camera in relation to the direction of travel of a vehicle (or person) used to transport the camera. For example, a plurality of cameras can be fixedly attached to a vehicle capturing Video DriveBy™ data. Each camera therefore maintains a constant direction of image capture in relation to the heading of the vehicle. Mechanics of the camera, such as, for example, lens parameters and shutter speed, can indicate a depth of field during camera image data capture. Some embodiments can also include simultaneously capturing multiple image data sets and correlating two or more of the image data sets. Correlation can be accomplished via a time stamp or other chronological or synchronous.

The position of a camera can be combined with a direction of image capture and the depth of field of the camera to determine a location of image data captured by the camera at a particular instance in time. The present invention can also include apparatus for utilizing echo location to determine a distance of an object from a camera capturing an image data set and storing a correlated distance with the image data set. For example, radar data can be correlated with a camera image data set to calculate the location of various objects captured by the camera. A time stamp can also be combined with data to quantify a location for a particular image formed by the captured image data.

In some embodiments of the present invention data used to calculate a location of an image is stored in a metadata file space associated with the image data. For example, some embodiments can store metadata in the exchangeable image file format (EXIF), TIFFTAGS or International Press Telecommunication Council (IPTC) formats. Image data may be stored, for example in JPEG or TIFF formats. However, other metadata formats can also be used. Typically, due to the size of data files that are generated during capture of Video DriveBy™ data, the image data and metafile data are stored on an external data storage device, such as a hard disk drive operatively attached to the camera. However, in some embodiments, the data can be stored in the camera.

As discussed above, the metadata can include data descriptive of some or all of: date and time; camera settings such aperture, shutter speed and focal length; geospatial data from a GPS receiver unit; accelerometer data; inertial guidance system data; camera orientation; and camera fixed position related to vehicle travel.

Figure 19:
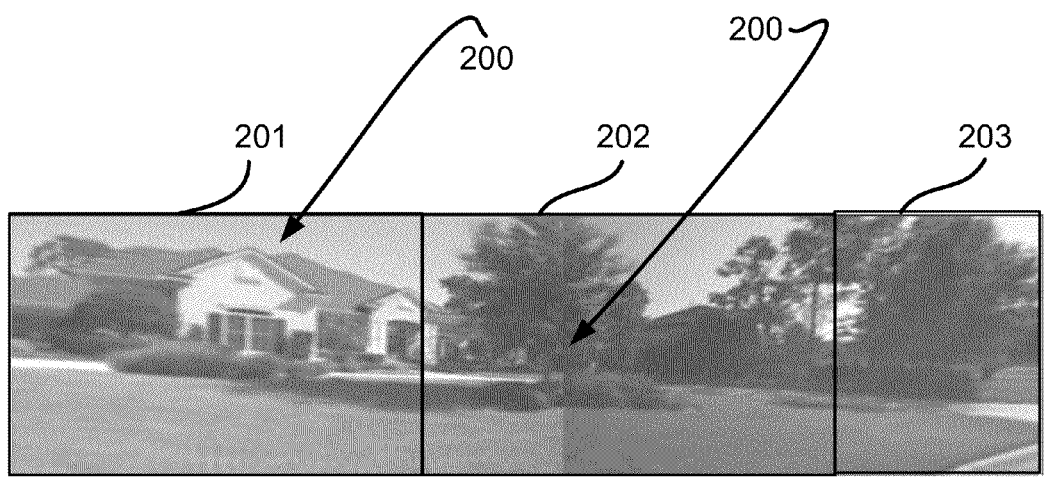
FIG. 19 illustrates multiple images captured from disparate points along a continuum.
Figure 20:
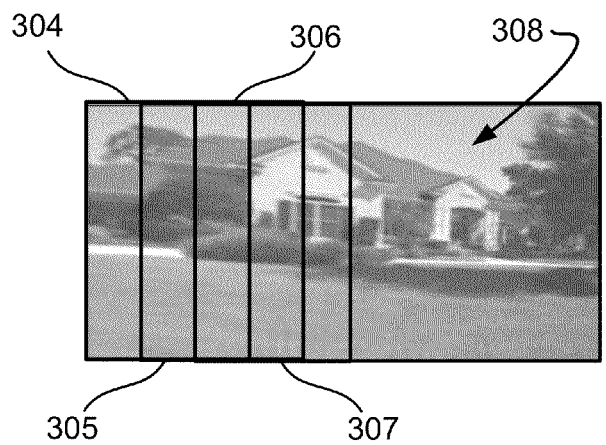
FIG. 20 illustrates multiple image data sets that overlap subject matter.

Referring now to FIG. 19, exemplary image data sets 201-203 are illustrated which capture images of a subject 200 from different points along a continuum. In some embodiments, as illustrated in FIG. 20, image data sets 304-307 overlap the subject matter captured. The overlap allows for features present in one image data set to be present in a second image data set, and preferably in a tertiary image data set.

Figure 21:
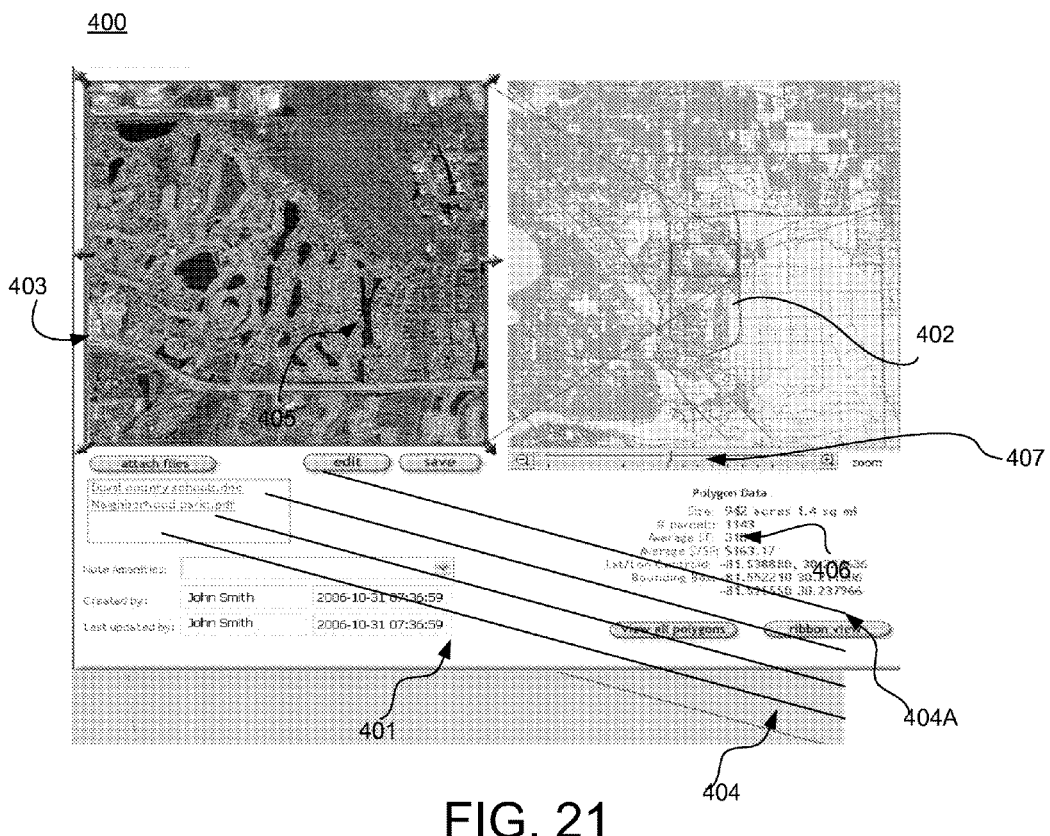
FIG. 21 illustrates a three-dimensional model generated form the image data sets.

Referring now to FIG. 21 a block diagram illustrates three-dimensional structures 405-407 created from image data captured. In some embodiments, the structures can be created by generating a point cloud array from a plurality of features contained in the image data sets and converting the point cloud array to a polygon based model. The polygon based model can be associated with a location relative to the image data set and image data can be sprayed over the polygon based model. In some preferred embodiments, image data sprayed over the polygon based models includes the composite of image data.

According to the present invention, a user can traverse the presentation of the composite of image data and the three-dimensional structures. Movement through the user interface can be accomplished with any known interaction device, such as, for example one or more of: a keyboard, mouse, video game controller Apple I Phone, digital cellular phone, remote controller, WiiMote and a joystick.

The user interface can allow a user to move in three directions through a scene presented. The directions can include an x coordinate providing a vertical dimension 401, a y dimension providing a horizontal dimension 402 and a z coordinate providing a depth dimension 403. Three-dimensional modeling sprayed with actual image data allows the user to proceed in "off-track" paths that do not match a path created by the disparate points from which data is collected.

In some embodiments, a time dimension can also be traversed, such as, for example, image data sets of a geospatial designation across time chronology such as a period of seasons or years. Some embodiments can include a "take me there" time designation, wherein a user can indicate a time period and geospatial description. According to the present invention, a three-dimensional model can be generated with image data sets from the indicated time period for the designated geospatial area.

As the user moves into a scene presented in the user interface, planes of image data 405 can change according to the perspective chosen by the user. For example, a three-dimensional structure of a house can be sprayed with image data included in the continuum composite of image data. The actual image data will correlate with a surface of the three-dimensional structure facing the disparate points from which the image data was captured. According to the present invention, additional surface of the house 406 can also be sprayed with a texture and color captured by the actual image data. In this way, as a user moves in a z direction beyond front surface of the house, the user will be presented with additional surfaces of the house, with each surface having a color and texture extrapolated from the image data from the front of the house.

In addition, an object such as a tree 405 can also be created in three dimensions with color and texture based upon the image data composite. In some embodiments, user interactive device controls can be provided which allow a user to remove objects such as the tree 405 and the house 406. Removal of an object will allow the user to see beyond the removed object into the scene provided. For example, if a tree 405 obscures the view of the front of a house 406, activation of a user interactive control can remove the tree 405 allowing an unobstructed view of the three-dimensional model of the house 406. If actual image data is not available for those portions of the house now viewable in the unobstructed view, then the present invention allows for color and texture data matching the known surfaces of the house to be sprayed over those portions now viewable.

Some embodiments can additionally allow a user to modify color and texture of three-dimensional models presented to them. Such modifications facilitate "what-if" scenarios. For example, a buyer contemplating purchasing a particular property can be presented with a three-dimensional model of the property with three-dimensional representations of objects on the property sprayed with actual image data captured of the property. According to some embodiments, the buyer can then modify the view presented to represent possible changes that may be made to the property. Changes may include, to continue the example, providing a brick facade over a painted surface, or removal of shrubbery, or addition of shrubbery. Addition of items can be provided from a menu of three-dimensional objects made available to the user. Color selections and textures can also be made available via a user selectable menu. In this fashion a unique blend of a composite continuum of image data and user defined image data can be presented, including three-dimensional modeled objects derived from the image data and user modifications to such models.

By way of non-limiting example, in some embodiments, a user may be able to select a building and designate from a user interface a type and color of roofing the user would like to see illustrated for the building. Accordingly, a user may designate an architectural shingle in various hues, or a Spanish tile or steel roof and the present invention will spray the pattern and color selected onto a three-dimensional model of the building. In still other embodiments, it is within the scope of some embodiments of the present invention to allow a user to upload a texture and color to be sprayed upon a three-dimensional model, or a portion of the three-dimensional model, such as a roof portion. According to such embodiments, a user may upload a color or hue or texture to be sprayed upon a three-dimensional model of a structure. The color and hue may also be stored and made available for subsequent application to portions of an image data set.

Figure 22:
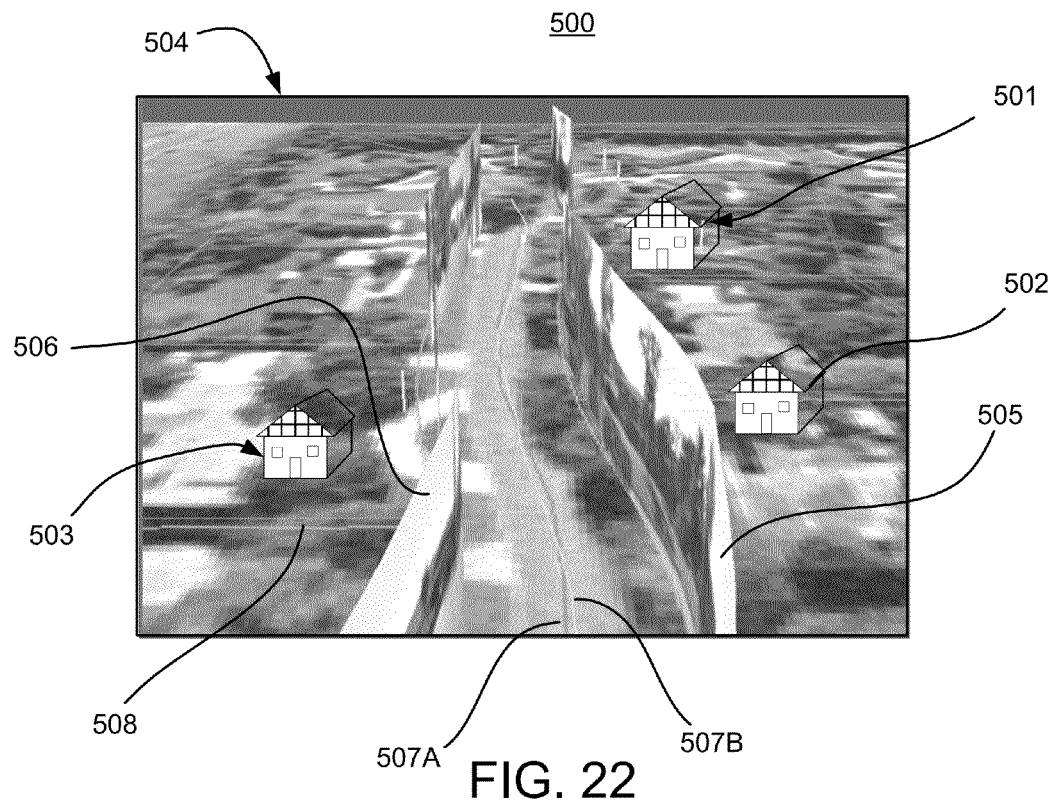
FIG. 22 illustrates a user interface generated from the image data sets and including multiple modalities of image data.

Referring now to FIG. 22, the present invention can also include generation of a user interface 500 with multiple representations of image data relating to a geographic area. For example, an aerial view of a geographic area 504 can be combined with one or more two-dimensional continuums of composite image data 505-506. The two-dimensional continuums of composite image data 505-506 can be generated according to methods and apparatus described in a related co-pending patent application by the same inventors. In addition, one or more continuums of disparate points from which image data is captured can also be indicated on the aerial view 504. Three-dimensional models 510-503 can also be included in the user interface 500 and located on the aerial view according to geospatial data generated during image data capture and processing of the image data.

As described in a related application, the three-dimensional models can be generated from multiple image data sets captured from disparate points along a continuum sprayed with the image data captured.

According to some embodiments of the present invention, a user may locate a particular geographic area via different vehicles made available to a user. For example, a user can enter a geospatial designation, such as, for example, one or more of: a street address; a Cartesian coordinate; a "Favorite" name designating a geospatial area; a popular name for a geospatial area; a coded indication for a geospatial area, such as a multiple listing number or data file number; and metadata. According to the present invention, a "take me there" command can be executed to bring the user to the requested geospatial area. Alternatively, the present invention provides a vehicle "cockpit" interface which allows a user to virtually "fly" over an aerial view and then transition into a virtual "dashboard" and "drive" mode along a street level two-dimensional continuum of actual image data, and in some preferred embodiments, a continuum of composite image data. The user may also transition into a virtual three-dimensional modality which includes three-dimensional models sprayed with image data captured from a continuum of disparate points. The three-dimensional models can be viewed from a virtual "drive by" mode or a virtual "walkabout." The virtual walkabout can allow a user to go off path and view the geographic area from amongst three-dimensional models sprayed with image data captured from a continuum of disparate points. In addition, as discussed above, the user may manipulate the appearance of the three-dimensional models.

A take me there command can be additionally operative to designate a modality, such as the aerial view, two-dimensional ribbon view, or three-dimensional drive by or three-dimensional walk about view into which a user will enter.

In another aspect of the present invention, a user can be provided with tools that provide analysis of the image data shown. Analysis can include, for example, designation of a particular portion of a geographic area 508. The portion 508 can be representative of a real estate parcel, as indicated by municipal records, or some other designation. For example, a user may draw a polygon 508 onto an aerial image of a geographic area 500 and ask for analysis of the area contained within the polygon 508.

Analysis can include, by way of example, a calculation of an area included within the polygon. Other analysis can include more sophisticated calculations. For example, it is within the scope of the invention to designate property boundaries, such as, through county record data and locate an image data of the property. The image data can be used to generate a three-dimensional model of the property, including a model of a house within the property boundaries and other features, such as trees and utility demarcations. Based upon the location of the house within the property boundaries, the present invention may also be used to generate a size of a front yard, and, by extrapolation, the size of the side and back yards. An approximate size of a house can also be calculated based the dimensions of the three-dimensional model generated. Other features, such as how many stories, the house includes and the type of facade the house has may also be ascertained from analyzing the image data and the model.

Statistical representations can also be made, according to the analysis. Statistical representations can provide a summary of characteristics of a single real estate parcel, or a designated area. By way of example, statistical analysis can include one or more of an average, median and high/low value designation for: the size of a property within a given neighborhood, the size of a front yard, how much road frontage each property includes, the average size of the houses within the designated area, the number of stories comprising the buildings within the area, siding types of buildings within the area, the size of side yards between houses, height of trees within the area, and almost any other data that may be calculated from the image data sets and the three-dimensional models.

Figure 23:
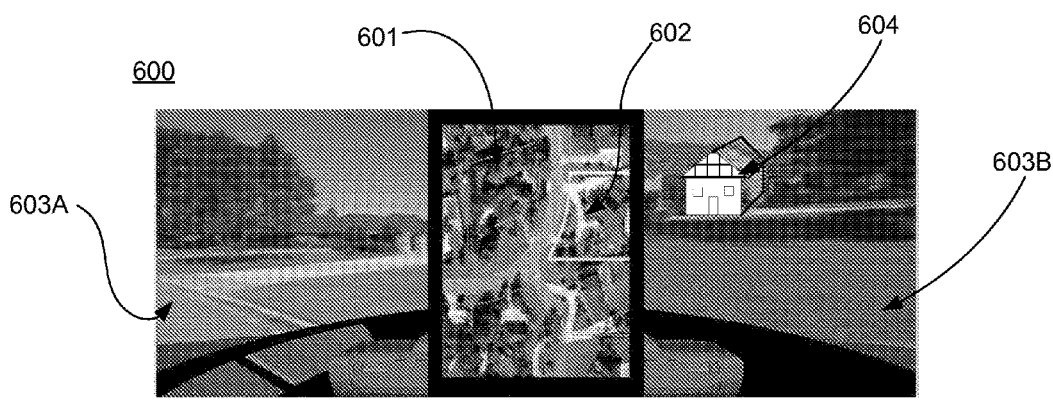
FIG. 23 illustrates an exemplary user interface for traversing multiple modalities of image data.

Referring now to FIG. 23, a view of an alternative exemplary user interface 600 according to the present invention is illustrated. The interface 600 can include a portion with an aerial view 601 and a polygon designation of geographic area of interest, such as for example, a particular real estate parcel or neighborhood location. The interface may also include a portion with a two-dimensional continuum of image data 603A. The continuum of image data is preferably a composite of image data sets captured from disparate points. Another portion 603B can include image data sprayed over three-dimensional models 604 generated from point clouds of features captured by the image data sets.

Figure 24:
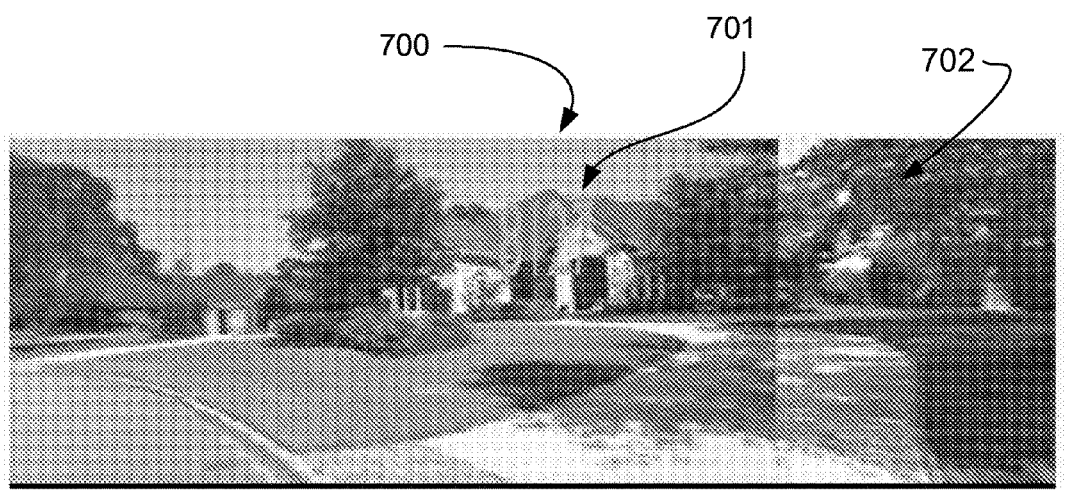
FIG. 24 illustrates an exemplary composite of image data set portions.

Referring now to FIG. 24, in some preferred embodiments, image data sprayed over the three-dimensional polygon formats includes a composite image formed by aligning two or more of the image data sets. Unlike stitching processes previously known, the present invention creates a composite through alignment of portions of data from more than one data set. Alignment can be accomplished in image data processing. Using image data processing, the images 701-703 are aligned to form a composite image 700. The composite image 700 is essentially two dimensional image data arranged as a second continuum, or ribbon. The second continuum includes ongoing image data 701-703 captured from the points defining the first continuum.

In some particular embodiments, the series of points of image capture in the first continuum includes positions of a vehicle carrying an image capture device, such as a camera, as the vehicle traverses a path proximate to a geographic area. The camera is positioned to capture image data of the geographic area. Image data 701-703 is periodically captured as the vehicle traverses the path. The motion of the vehicle, combined with the periodic capture of image data 701-703, thereby results in image data 701-703 being captured from disparate points along the first continuum.

A preferred embodiment includes capture of image data with a motion vector of the camera in space maintained generally orthogonal to a subject for which image data will be captured. Orthogonal capture of the image data can facilitate consistency for subsequent composite of portions of the image data captured. Therefore, data captured at an angle of between about 75° and 105° can provide data most easily assembled into a continuum of data. However, other angles may be used to create different effects. In addition, in some embodiments physical limitation may dictate the use of other angles. In such instances, post processing can be utilized to compensate for the angle of image data capture.

During image data processing, some or all of the images are aligned to form a composite image in the form of a continuous pictorial representation of the geographic area. One commercial embodiment of a continuous pictorial representation includes RibbonView™ by Real Data Systems. RibbonView™ correlates a ribbon of geographic image data with geospatial designations to facilitate identification of a particular geographic area, as discussed more fully below. In various embodiments, image capture processing can be accomplished in real time or via post image capture processing.

In some embodiments, select portions 704-707 of two or more sets of captured image data are aligned to generate the composite image 708. As illustrated, some preferred embodiments include vertical slices of data 704-707 aligned in a horizontal plane to form the composite image 708. Unlike a traditional photograph taken with a macro lens, according to the present invention, the length of a horizontal plane defining a composite image 708 is only limited by the length of a continuum along which points are defined and from which image data 704-707 is captured.

The use of only slices of data 704-707 from any particular captured image provides for a higher quality image 708. The quality is increased, for example, when a temporary obstruction, such as a passing car, person or animal, captured in one image data set, is only represented in a thin slice of a continuous ribbon 704-707 data. In addition, alignment of multiple thin slices of image data 704-707 is facilitated from the perspective of which aberrations typical human sensory is capable of distinguishing. Numerous thin slices 704-707 are perceived as a smoother transition across the horizontal plane defining the composite image 708 removing a choppiness that may be experienced with the use of larger data images.

The present invention can include a uniform width of each slice of data 704-707 or a variable width. The width of a particular slice may vary, for example, upon one or more of the velocity of a vehicle from which image data sets are captured, the sample rate of a camera used to capture an image data set 701-703, the resolution of a picture comprising an image data set 701-703 and the path of a camera. A high resolution image generated by a 2.1 mega pixel camera may have a 1600 by 1200 resolution and allow for a thinner slice 704-707 that includes a width of between about 5 to 700 pixels of an image data set. Embodiments with very high quality can include a slice 704-707 of between 1 to 2 pixels.

From a different perspective, some embodiments can include a slice 704-707 of an image data set 701-703 that includes a percentage of the image data set 701-703. Accordingly, some preferred embodiments can include a slice 704-707 of between about 5% to about 12% of an image data set. Other preferred embodiments can include up to about 50% of an image data set. However, it should be understood that some embodiments include a slice 704-707 that constitutes any fraction of the complete image data set.

It should be noted that although preferred embodiments may utilize vertical rectangular slices 704-709, the scope of the present invention is not limited by which portion of an image data set 701-703 is utilized to generate a composite image 270. Therefore, it is within the scope of the invention to use any portion of any image data set 701-703 to generate a composite image. Accordingly, slices of an image 701-703 other than vertical slices 704-709 may be apportioned and combined into a composite image 270. Slices may therefore include a slice angled at 60° or 75°, or other angle conducive to a particular application. In addition, it is also within the scope of the present invention to utilize irregular shaped portions of two or more image data sets 701-703 to generate a composite image 270.

In some embodiments, a database or other data processing mechanism, can track each portion or slice 704-708 utilized to construct a continuum and associate the slice 704-708 with an original image 701-703 from which the slice 704-708 is derived. User interactive devices can execute the retrieval of an entire original image 701-703 or a series of original images 701-703 upon request. In some instances, one or more original images 701-703 may provide detail not included in the composite image 708.

In some embodiments, a selected portion of an image data set may be determined by the physical attributes of the equipment used to capture an image data set. For example, a typical camera lens can impart some distortion to an image data set, as represented in the illustration by an elongated portion and a compressed portion. Utilizing only a portion of an image data set, such as, for example, a center portion vertical slice, can minimize the effect of distortion introduced by a lens, or other source, to a composite image. Distortion is minimized when the composite image is made to include those portions of the image data set corresponding with the center of the lens. Specific embodiments may likewise account for other aberrations that may be present in a set of image data.

It will be apparent to those schooled in the art that the length of a composite image generated according to the present invention is limited only by the ability to capture image data from additional points on a continuum and store the captured image data for post processing. The post processing allows for the alignment of portions of the image data compiled into a composite two-dimensional view that can continue so long as additional image data is made available to be added to it.

Apparatus

Figure 25:
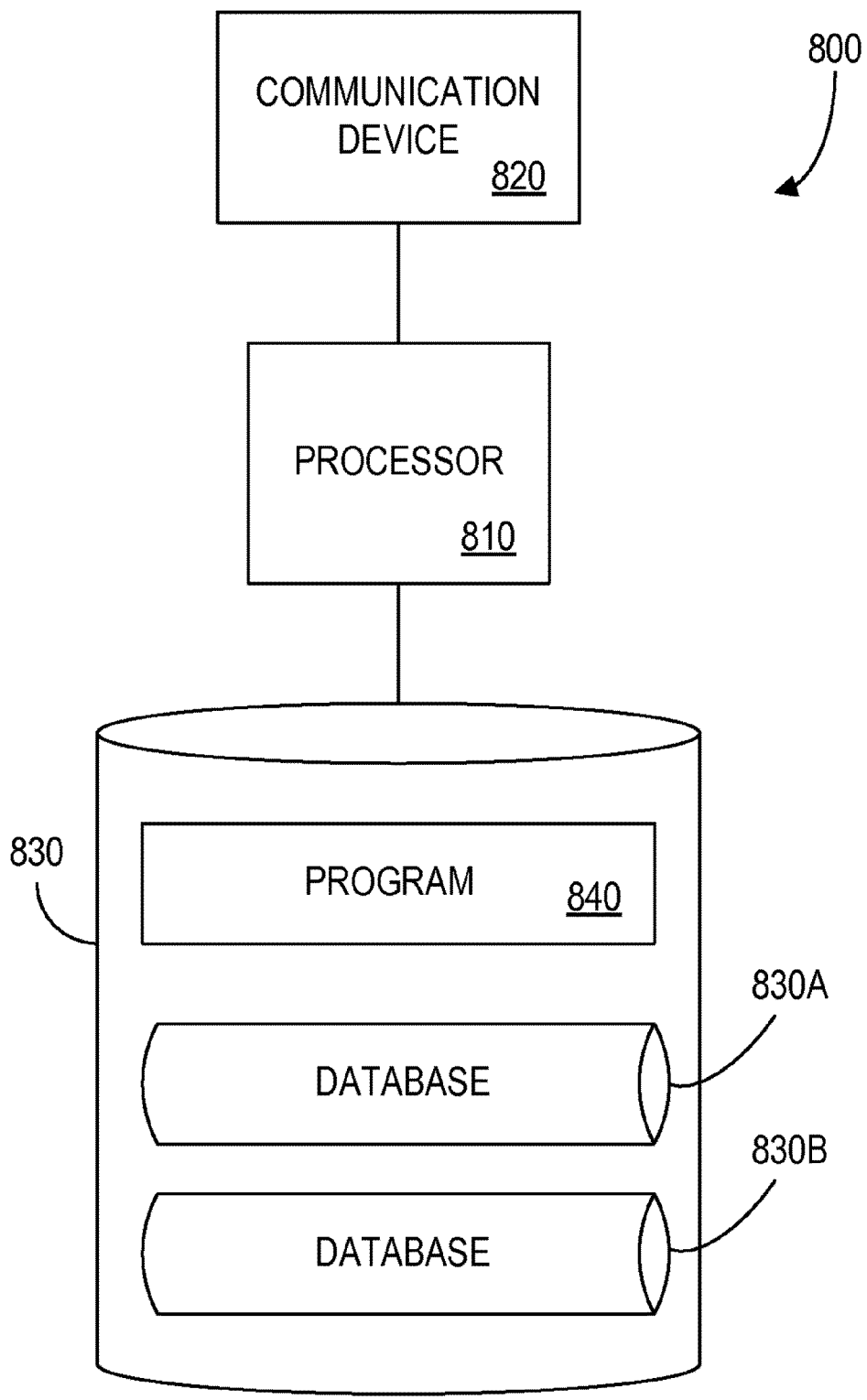
FIG. 25 illustrates apparatus what may be used to implement the present invention.

The teachings of the present invention may be implemented with any apparatus capable of embodying the innovative concepts described herein. Image capture can be accomplished, for example, via a digital camera capable of capturing 12 or more images per second. In addition, FIG. 25 illustrates a controller 800 that may be utilized to implement some embodiments of the present invention. The controller 800 comprises a processor unit 810, such as one or more processors, coupled to a communication device 820 configured to communicate via a communication network (not shown in FIG. 25). The communication device 820 may be used to communicate, for example, with one or more online devices, such as a personal computer, laptop or a handheld device.

The processor 810 is also in communication with a storage device 830. The storage device 830 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 830 can store a program 840 for controlling the processor 810. The processor 810 performs instructions of the program 840, and thereby operates in accordance with the present invention. The processor 810 may also cause the communication device 820 to transmit information, including, in some instances, control commands to operate apparatus to implement the processes described above. The storage device 830 can additionally store related data in a database 830A and database 830B, as needed.

In some preferred embodiments, apparatus includes a video and data server farm. The video and data server farm includes at least one video storage server that stores video image files containing video drive-by data that corresponds to a geographic location, a database server that processes a data query received from a user over the Internet that corresponds to a geographic location of interest, and an image server. In operation, the database server identifies video image files stored in the video storage server that correspond to the geographic location of interest contained in the data query, and transfers the video image files over a pre-processing network to the image processing server. The image processing server converts the video drive-by data to post-processed video data corresponding to a desired image format, and transfers the post-processed video data via post-processing network to the Internet response to the query.

A landing zone server can also be included which receives the video drive-by data from a portable memory device and permits the viewing and analysis of the video drive-by data prior to storage in the video storage server. Still further, a map server is preferably provided to present a static image an overhead view of the geographic location of interest.

Embodiments can also include one or more servers described above included in one or more physical units. Each server does not need to be a disparate apparatus. Still other embodiments can include one or more or the servers described above included in multiple physical units. Some embodiments can even include a single server, as described which includes multiple physical apparatus units at disparate locations.

Figure 26:
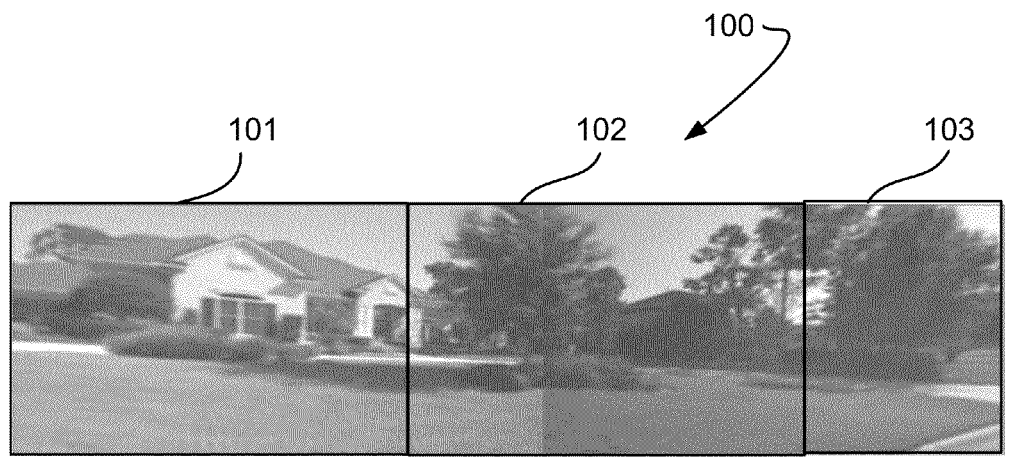
FIG. 26 illustrates basic geographic images captured from a camera at disparate points along a continuum and aligned with post processing.

Referring now to FIG. 26, three images 101-103 are illustrated. Each of the images 101-103 is reproduced from image data captured from a disparate point on a continuum. As illustrated, a composite image 100 is formed by aligning two or more of the image data sets. Unlike stitching processes previously known, the present invention creates a composite through alignment of portions of data from more than one data set. Alignment can be accomplished in image data processing. Using image data processing, the images 101-103 are aligned to form a composite image 100. The composite image 100 is essentially two dimensional image data arranged as a second continuum, or ribbon. The second continuum includes ongoing image data 101-103 captured from the points defining the first continuum.

In some particular embodiments, the series of points of image capture in the first continuum includes positions of a vehicle carrying an image capture device, such as a camera, as the vehicle traverses a path proximate to a geographic area. The camera is positioned to capture image data of the geographic area. Image data 101-103 is periodically captured as the vehicle traverses the path. The motion of the vehicle, combined with the periodic capture of image data 101-103, thereby results in image data 101-103 being captured from disparate points along the first continuum.

A preferred embodiment includes capture of image data with a camera maintained orthogonal to the subject. Orthogonal capture of the image data provides consistency for subsequent composite of portions of the image data captured.

Therefore, data captured at an angle of between about 75° and 105° can provide data most easily assembled into a continuum of data. However, other angles may be used to create different effects.

During image data processing, some or all of the images are aligned to form a composite image in the form of a continuous pictorial representation of the geographic area. One commercial embodiment of a continuous pictorial representation includes RibbonView™ by Real Data Systems. RibbonView™ correlates a ribbon of geographic image data with geospatial designations to facilitate identification of a particular geographic area, as discussed more fully below. In various embodiments, image capture processing can be accomplished in real time or via post image capture processing.

Figure 27:
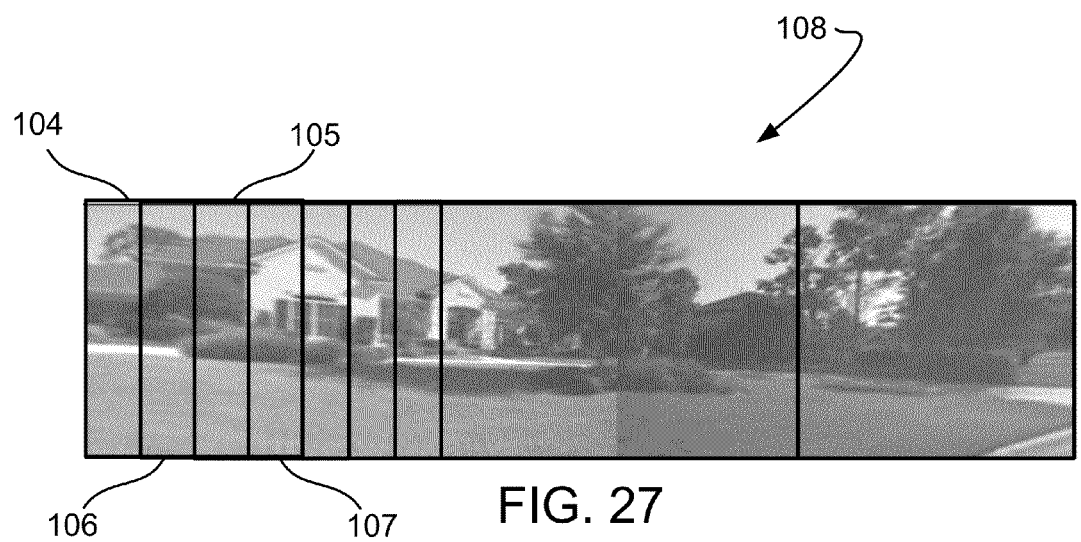
FIG. 27 illustrates an alignment of portions of two or more images captured from disparate points along a continuum to form a composite image.

Referring now to FIG. 27, in some embodiments, select portions 104-107 of two or more sets of captured image data are aligned to generate the composite image 108. As illustrated, some preferred embodiments include vertical slices of data 104-107 aligned in a horizontal plane to form the composite image 108. Unlike a traditional photograph taken with a macro lens, according to the present invention, the length of a horizontal plane defining a composite image 108 is only limited by the length of a continuum along which points are defined and from which image data 104-107 is captured.

The use of only slices of data 104-107 from any particular captured image provides for a higher quality image 108. The quality is increased, for example, when a temporary obstruction, such as a passing car, person or animal, captured in one image data set, is only represented in a thin slice of a continuous ribbon 104-107 data. In addition, alignment of multiple thin slices of image data 104-107 is facilitated from the perspective of which aberrations typical human sensory is capable of distinguishing. Numerous thin slices 104-107 are perceived as a smoother transition across the horizontal plane defining the composite image 108 removing a choppiness that may be experienced with the use of larger data images.

The present invention can include a uniform width of each slice of data 104-107 or a variable width. The width of a particular slice may vary, for example, upon one or more of the velocity of a vehicle from which image data sets are captured, the sample rate of a camera used to capture an image data set 101-103, the resolution of a picture comprising an image data set 101-103 and the path of a camera. A high resolution image generated by a 2.1 mega pixel camera may have a 1600 by 1200 resolution and allow for a thinner slice 104-107 that includes a width of between about 5 to 100 pixels of an image data set. Embodiments with very high quality can include a slice 104-107 of between 1 to 2 pixels.

From a different perspective, some embodiments can include a slice 104-107 of an image data set 101-103 that includes a percentage of the image data set 101-103. Accordingly, some preferred embodiments can include a slice 104-107 of between about 5% to about 12% of an image data set. Other preferred embodiments can include up to about 50% of an image data set. However, it should be understood that some embodiments include a slice 104-107 that constitutes any fraction of the complete image data set.

Figure 28:
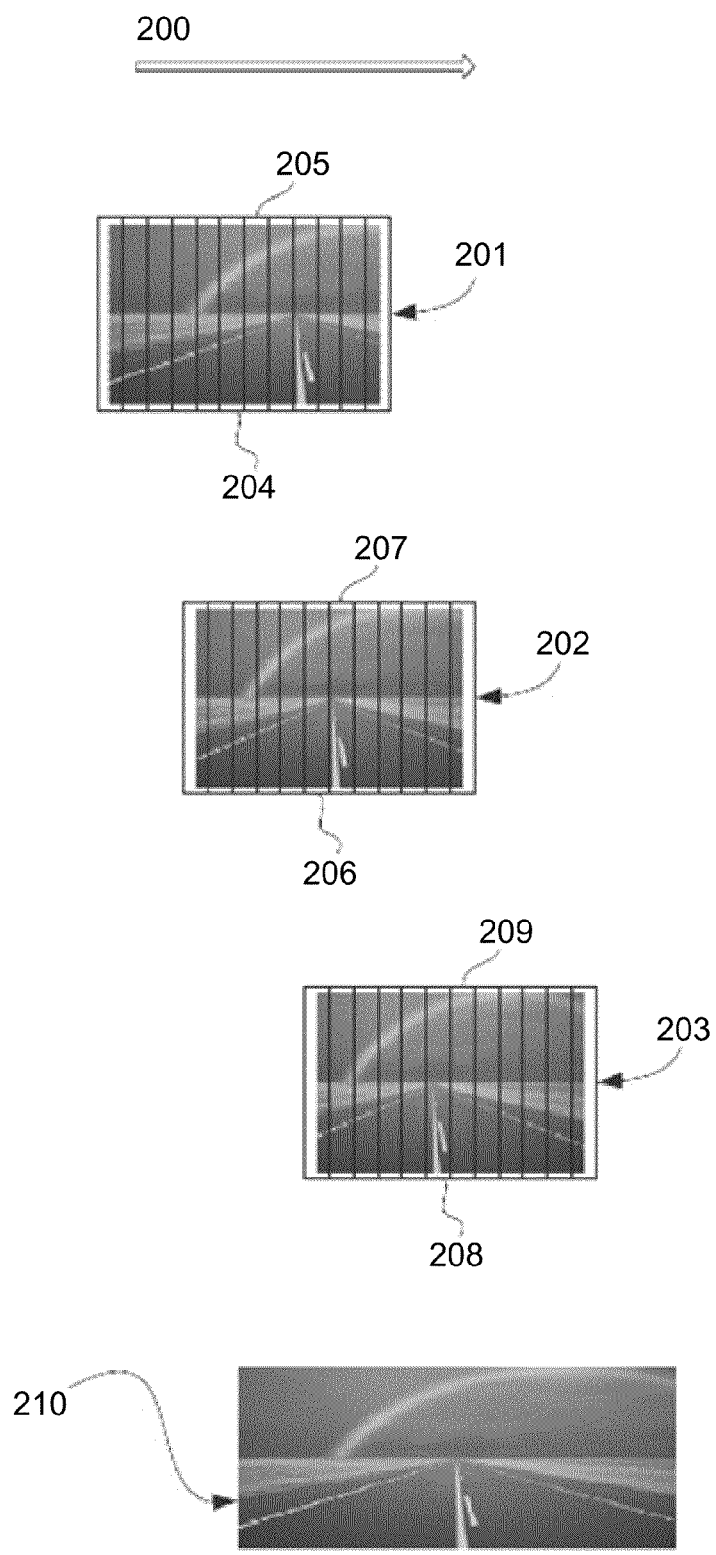
FIG. 28 illustrates multiple images captured from disparate points along a continuum and specific vertical slices that can be selected to create a composite image.

Referring now to FIG. 28, three sets of image data 201-203 are illustrated, wherein each set of image data 201-203 represents data captured from a disparate point on a continuum proximate to the landscape captured. A direction of travel along the continuum 200 is also illustrated. Each data set 201-203 is divided into multiple slices of image data 204-209. A composite image 210 is generated from the multiple slices 204-209, and in the exemplary case at hand, additional slices from additional image data sets.

It should be noted that although preferred embodiments may utilize vertical rectangular slices 204-209, the scope of the present invention is not limited by which portion of an image data set 201-203 is utilized to generate a composite image 210. Therefore, it is within the scope of the invention to use any portion of any image data set 201-203 to generate a composite image. Accordingly, slices of an image 201-203 other than vertical slices 204-209 may be apportioned and combined into a composite image 210. Slices may therefore include a slice angled at 60° or 75°, or other angle conducive to a particular application. In addition, it is also within the scope of the present invention to utilize irregular shaped portions of two or more image data sets 201-203 to generate a composite image 210.

In some embodiments, a database or other data processing mechanism, can track each portion or slice 204-208 utilized to construct a continuum and associate the slice 204-208 with an original image 201-203 from which the slice 204-208 is derived. User interactive devices can execute the retrieval of an entire original image 201-203 or a series of original images 201-203 upon request. In some instances, one or more original images 201-203 may provide detail not included in the composite image 208.

Figure 29:
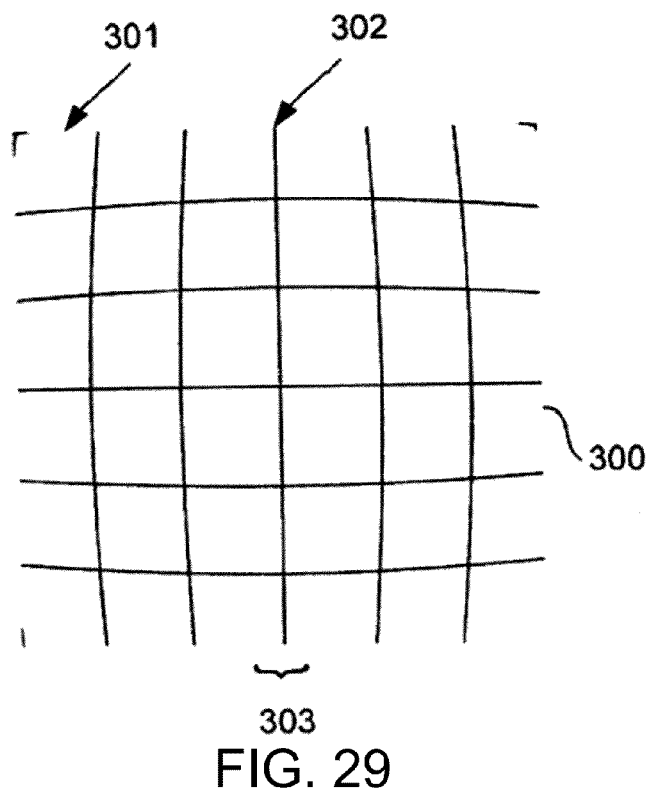
FIG. 29 illustrates a block diagram of exemplary lens distortion factors and a preferred area of lens capture that can be selected in some embodiments of the present invention.

Referring now to FIG. 29, in some embodiments, a selected portion 303 of an image data set 300 may be determined by the physical attributes of the equipment used to capture an image data set. For example, a typical camera lens can impart some distortion to an image data set, as represented in the illustration by an elongated portion 301 and a compressed portion 302. Utilizing only a portion 302 of an image data set 300, such as, for example, a center portion vertical slice 303, can minimize the effect of distortion introduced by a lens, or other source, to a composite image 108. Distortion is minimized when the composite image 108 is made to include those portions of the image data set corresponding with the center of the lens 303. Specific embodiments may likewise account for other aberrations that may be present in a set of image data.

Figure 30:
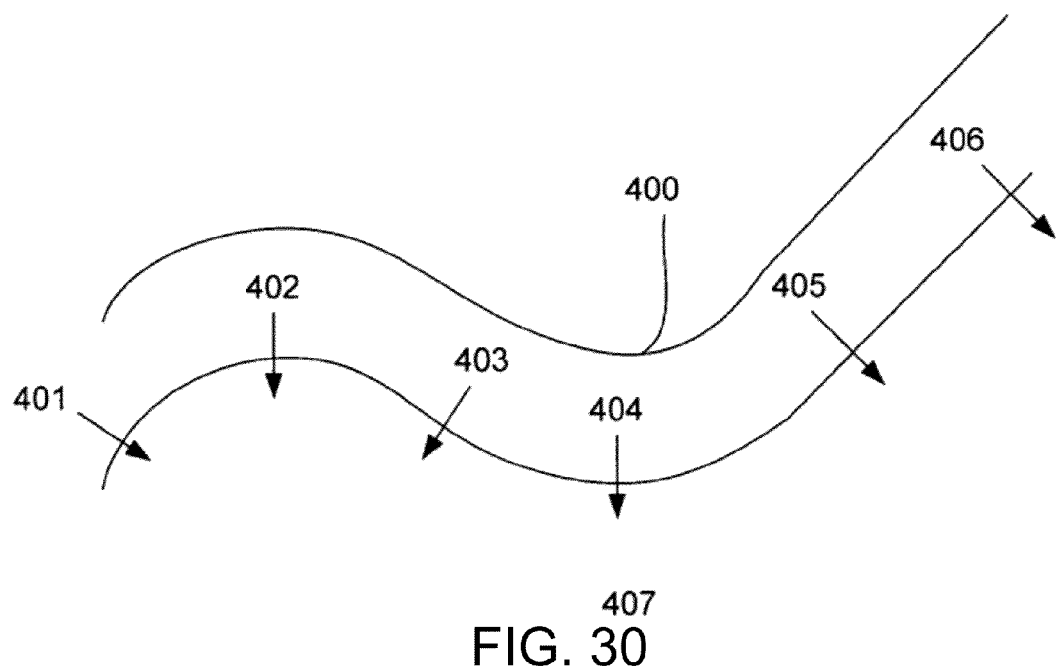
FIG. 30 illustrates disparate points on a continuum with an orientation vector associated with each respective point.

In another aspect of the invention, and referring now to FIG. 30, positional data descriptive of a location of the subject matter of an image can also be generated by the image data recording device. Positional data can include any data indicative of where the subject matter of an image is located. Some preferred embodiments can include Cartesian coordinates that are context sensitive according to the mechanism used to generate coordinate data.

For example, an image recording device, such as a camera, can be associated with a device for recording a global position, such as a global positioning system (GPS) device or other equipment. Time stamps associated with image data and time stamps associated with the GPS data can be utilized to correlate the GPS location data with image data recorded by the camera.

In still another aspect, in some embodiments, an altimeter can be used to record an altitude from which a camera records image data sets. The altitude data can be associated with an image data set, for example, metadata correlated with the image data set. Such embodiments can therefore include recordation of a latitude, longitude and altitude coordinate for a given image data set. In addition, it is also within the scope of this invention to record a time of generation of an image data set and a depth of focus for an image data set.

According to the present invention, geospatial data, such as latitude and longitude coordinates, can be generated by the GPS and stored with image data generated by the camera. In some embodiments, GPS data can be time stamped and collected once every second. However, in some instances, GPS reception can be interrupted, depending upon location relative to large object, such as multistory buildings, or cold cover. Therefore, some additional embodiments can include an accelerometer for recording motion associated with a camera and a GPS unit operatively attached to the camera.

Data from the accelerometer can indicate movement of the camera. Some accelerometers, such as micro electromechanical system (MEMs) accelerometers can easily be incorporated into a camera system assembly attached to a vehicle. Use of multiple MEM accelerometers positioned to measure movement in four or more directions along an x-axis, y-axis, and z-axis in relation to a camera can also be used to calculate direction of movement. The accelerometer can therefore be used to extrapolate a current position of the camera, based upon a last set of GPS geospatial data recorded.

Geospatial data can be used to indicate an initial geographic position. A change in geospatial data can be additionally utilized to indicate velocity and direction of image data set capture. Accelerometer data may also be used to indicate a velocity and direction of image data set capture. Accelerometer data may also be used to indicate a velocity and direction of camera movement. Calculations of time elapsed at the indicated velocity (such as for example, the Kalman Filter) can yield a calculated position at a time of image capture, even if the time of image capture is between GPS readings.

For example, one standard can include tracking a camera position with a GPS unit that records location at a rate of once per second. The camera can record image data at a faster rate than once per second, such as, for example, one of: 12 images per second, 24 images per second or 29.97 images per second. An initial camera position can be recorded which correlates with a GPS reading, subsequent image data capture will occur in between the one second GPS reading interval. The camera position can be determined with a calculation based upon the velocity of camera movement supplied by the accelerometer and time elapsed since a previous GPS reading.

Still other embodiments can utilize optical flow methodology and visual odometry to facilitate calculations of a camera position and the velocity of a vehicle or person from which a series of image data sets are captured. Visual odometry can be accomplished with a single omni-directional camera or with stereo cameras, and is based upon processing which tracks the position of salient features in a series of feature sets and calculates movement based upon the relative positions of the features. In some embodiments, camera based simultaneous localization and mapping (SLAM) of visual image data can also be used to facilitate calculations of velocity of a change in position of a camera used to capture image data sets. Typically, the velocity will be directly tied to the motion of a vehicle to which the camera is mounted, or a person carrying a camera rig.

Orientation of a camera can include a direction of image capture recorded by the camera. Orientation can be designated, for example, in relation to the cardinal directions, i.e. north, south, east and west. Any means available to record such a designation, such as an electronic compass, is within the scope of the present invention. However, it may be desirable to include a means to record the orientation with a greater degree of accuracy than is typically available through the use of an electronic compass.

Therefore, in some embodiments, orientation can be determined according to a fixed position of a camera in relation to the direction of travel of a vehicle (or person) used to transport the camera. For example, a plurality of cameras can be fixedly attached to a vehicle capturing Video DriveBy™ data. Each camera therefore maintains a constant direction of image capture in relation to the heading of the vehicle. Mechanics of the camera, such as, for example, lens parameters and shutter speed, can indicate a depth of field during camera image data capture. Some embodiments can also include simultaneously capturing multiple image data sets and correlating two or more of the image data sets. Correlation can be accomplished via a time stamp or other chronological or synchronous.

The position of a camera can be combined with a direction of image capture and the depth of field of the camera, to determine a location of image data captured by the camera at a particular instance in time. The present invention can also include apparatus for utilizing echo location to determine a distance of an object from a camera capturing an image data set and storing a correlated distance with the image data set. For example, radar data can be correlated with a camera image data set to calculate the location of various objects captured by the camera. A time stamp can also be combined with data to quantify a location for a particular image formed by the captured image data.

In some embodiments of the present invention data used to calculate a location of an image is stored in a metadata file space associated with the image data. For example, some embodiments can store metadata in the exchangeable image file format (EXIF), TIFFTAGS or International Press Telecommunication Council (IPTC) formats. Image data may be stored, for example in JPEG or TIFF formats. However, other metadata formats can also be used. Typically, due to the size of data files that are generated during capture of Video DriveBy™ data, the image data and metafile data are stored on an external data storage device, such as a hard disk drive operatively attached to the camera. However, in some embodiments, the data can be stored in the camera.

As discussed above, the metadata can include data descriptive of some or all of: date and time; camera settings such aperture, shutter speed and focal length; geospatial data from a GPS receiver unit; accelerometer data; inertial guidance system data; camera orientation; and camera fixed position related to vehicle travel.

Figure 31:
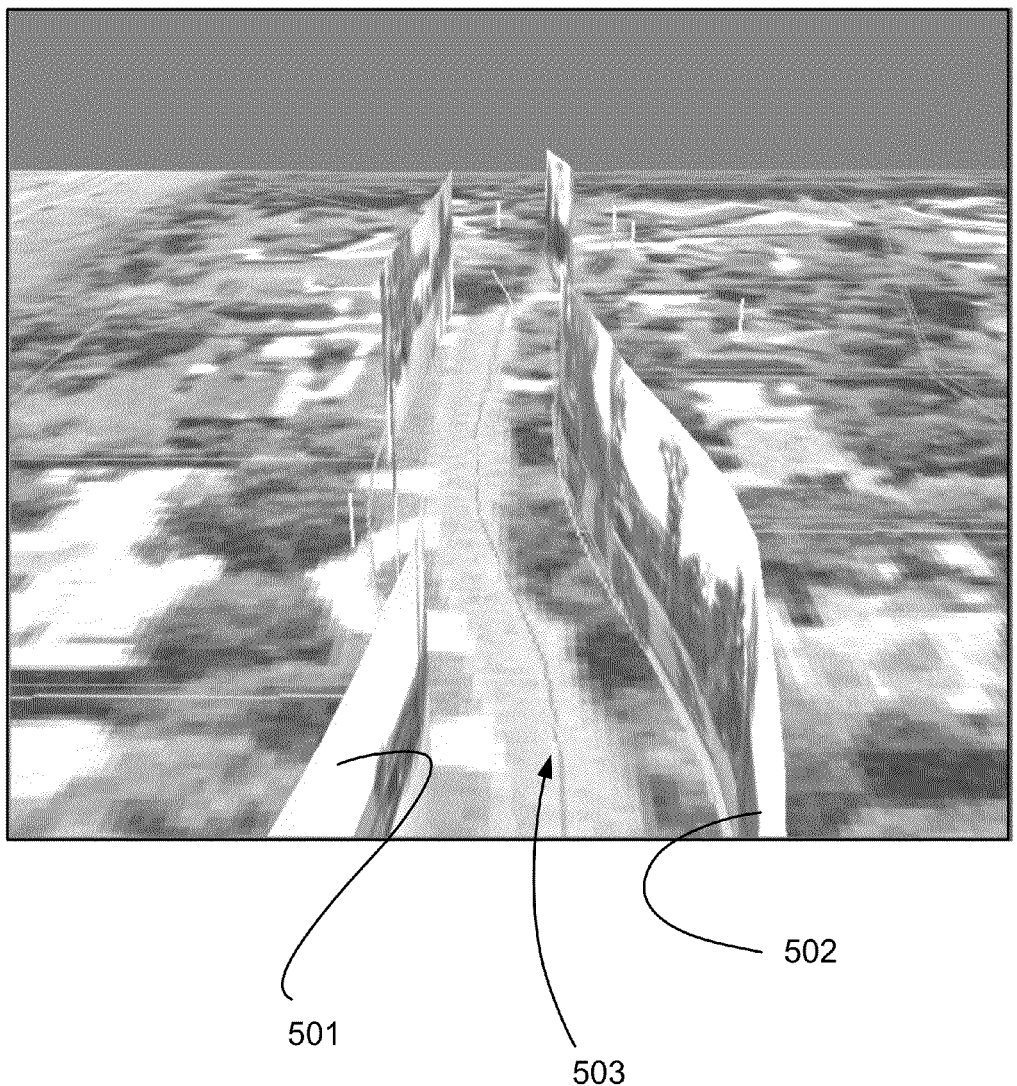
FIG. 31 illustrates a canyon formed by two continuums of image data according to the present invention.

Referring now to FIG. 31, an illustration of some RibbonView™ embodiments of the present invention is illustrated. The RibbonView™ illustrated 501-502 includes strips or ribbons of two-dimensional image data. Each strip 501-502 is generated via the capture of image data along a continuum 503. As illustrated, the continuum 503 generally follows the roadway in the center of the illustration. Each composite image 501-502 is generated through the alignment of a portion of multiple images captured as data from disparate points along the continuum 503. In some preferred embodiments, the present invention delivers two ribbons of composite images 501-502 with different views captured along the continuum. Each view is generated by a camera with a separate orientation.

It will be apparent to those schooled in the art that the length of a composite image generated according to the present invention is limited only by the ability to capture image data from additional points on a continuum and store the captured image data for post processing. The post processing allows for the alignment of portions of the image data compiled into a composite two-dimensional view that can continue so long as additional image data is made available to be added to it.

Apparatus

Figure 32:
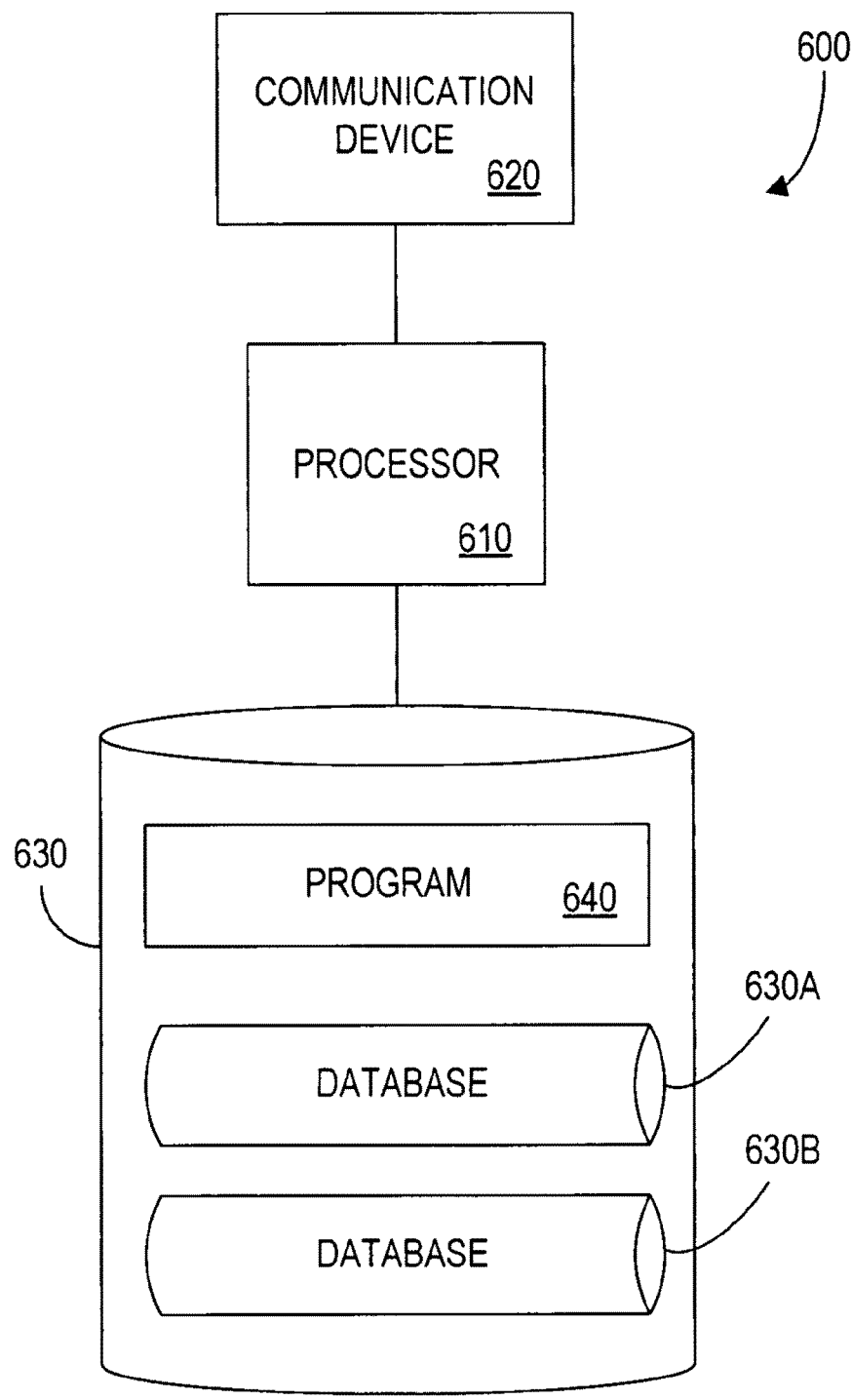
FIG. 32 illustrates apparatus that can be used to implement some embodiments of the present invention.

The teachings of the present invention may be implemented with any apparatus capable of embodying the innovative concepts described herein. Image capture can be accomplished, for example, via a digital camera capable of capturing 12 or more images per second. In addition, FIG. 32 illustrates a controller 600 that may be utilized to implement some embodiments of the present invention. The controller 600 comprises a processor unit 610, such as one or more processors, coupled to a communication device 620 configured to communicate via a communication network (not shown in FIG. 32). The communication device 620 may be used to communicate, for example, with one or more online devices, such as a personal computer, laptop or a handheld device.

The processor 610 is also in communication with a storage device 630. The storage device 630 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 630 can store a program 640 for controlling the processor 610. The processor 610 performs instructions of the program 640, and thereby operates in accordance with the present invention. The processor 610 may also cause the communication device 620 to transmit information, including, in some instances, control commands to operate apparatus to implement the processes described above. The storage device 630 can additionally store related data in a database 630A and database 630B, as needed.

CONCLUSION

The invention has been described with reference to certain preferred embodiments thereof. It will be understood, however, that modifications and variations are possible within the scope of the appended claims. For example, various methods or equipment may be used to implement the process steps described herein or to create a device according to the inventive concepts provided above and further described in the claims. In addition, various integration of components, as well as software and firmware can be implemented.

For example, while the illustrated embodiment utilizes a camera array containing analog cameras requiring digital conversation, the camera array may be implemented with cameras that directly produce a digital output. Also, digital cameras may be employed instead of analog cameras with separate A/D converters. The number of cameras in the array may also vary. Further, while the preferred embodiment utilizes external hard disk drives, it will be understood that any type of portable memory device having sufficient capacity to store the video data may be utilized. Still further, it will be understood that the various processing methods may be implemented utilizing the servers of the Video and Data Server Farm, the processing unit, i.e. the laptop computer, of the Video Capture System, and/or other processors linked thereto through the Internet or other network means, including various combinations of all three. Accordingly, other embodiments are within the scope of the following claims.

What is claimed is:

1. A method, comprising:
 (a) receiving a first request, wherein the request is received across a network by a processing device including a memory and a processor;
 (b) transmitting user interface data, wherein the user interface data comprises:
  overhead map data; and
  a click through link associated with a first real estate property indicated in the overhead map data, wherein the click through link initiates a second request for captured image data including composite image data comprising at least a portion of multiple image frames captured by a camera attached to a vehicle and calculated to be oriented at street level towards a centroid of a real estate parcel associated with the first real estate property;
 (c) receiving the second request; and
 (d) transmitting the captured image data and layer data associated with the first real estate property.

2. The method of claim 1, wherein the camera is a video camera, and wherein the captured image data includes multiple frames captured by the video camera.

3. The method of claim 1, wherein the captured image data is captured by a plurality of cameras oriented at street level to the first real estate property, and wherein each of the plurality of cameras are approximately co-located.

4. The method of claim 1, wherein the first request of (a) is a webpage request made by a browser.

5. The method of claim 1, wherein the transmitting of (b) is performed in response to receiving the first request in (a), wherein the overhead map data is used to display a map to a user, wherein the click through link is superimposed on the map and is visible to the user, and wherein the first real estate property is indicated on the map.

6. The method of claim 1, wherein the second request of (c) is a webpage request made by a browser.

7. The method of claim 1, wherein the transmitting of (d) is performed in response to receiving the second request in (c), wherein the layer data is superimposed on the captured image data, thereby generating a composite image, and wherein the composite image is displayed to a user.

8. The method of claim 1, wherein the layer data includes information taken from the group consisting of : geo-coded data, vector data, property county parcel data, landmark data or county property line data.

9. The method of claim 1, wherein the captured image data associated with the first real estate property comprises an image that that is centered on a centroid of a parcel on which the first real estate property is located.

10. The method of claim 1, wherein the layer data includes information taken from the group consisting of : record data, sale price data of the first real estate property, sale price data of a comparable real estate property, owner data, or address data of the first real estate property.

11. The method of claim 1, wherein the layer data includes information taken from the group consisting of: Multiple Listing Services (MLS) data or a visual cue data indicating where the first real estate property is located within the captured image data.

12. The method of claim 1, wherein the camera is attached to a vehicle traveling at street level relative to the first real estate property, and wherein the captured image data comprises a plurality of images captured from discrete points traversed by the vehicle while the vehicle is in proximity to the first real estate property.

13. The method of claim 1, wherein the captured image data transmitted in (d) includes a plurality of images of the first real estate property.

14. The method of claim 1, wherein the captured image data is captured via a plurality of cameras, wherein each of the plurality of cameras are co-located, and wherein each of the plurality of cameras are oriented in a unique direction.

15. The method of claim 14, wherein the captured image data includes three hundred and sixty degree street views about the plurality of cameras.

16. The method of claim 1, further comprising:
 (e) transmitting aerial data associated with the first real estate property, wherein the aerial data includes an overhead photo of the first real estate property.

17. The method of claim 1, wherein the network in (a) is the Internet.

18. The method of claim 1, further comprising:
(e) receiving a third request for captured image data including an image captured by the camera oriented at street level to a second real estate property; and
(f) transmitting captured image data and layer data associated with the second real estate property.

19. The method of claim 18, wherein the third request of (e) is a webpage request made by a browser, and wherein the network in (a) is the Internet.

20. The method of claim 18, wherein the transmitting of (f) is performed in response to receiving the third request in (e), wherein the layer data is superimposed on the captured image data including an image captured by the camera oriented at street level to the second real estate property, thereby generating a composite image, and wherein the composite image is displayed to a user.

* * * * *